United States Patent
Hildebrand et al.

(10) Patent No.: US 8,360,728 B2
(45) Date of Patent: Jan. 29, 2013

(54) AIRCRAFT WITH TRANSIENT-DISCRIMINATING PROPELLER BALANCING SYSTEM

(75) Inventors: Steve F. Hildebrand, Apex, NC (US); Russell E. Altieri, Cary, NC (US); Wayne Winzenz, Raleigh, NC (US)

(73) Assignee: Lord Corporation, Cary, NC (US)

( * ) Notice: Subject to any disclaimer, the term of this patent is extended or adjusted under 35 U.S.C. 154(b) by 1272 days.

(21) Appl. No.: 11/870,891

(22) Filed: Oct. 11, 2007

(65) Prior Publication Data

US 2009/0306829 A1 Dec. 10, 2009

Related U.S. Application Data

(60) Provisional application No. 60/829,019, filed on Oct. 11, 2006.

(51) Int. Cl.
B64C 11/00 (2006.01)
G01M 1/38 (2006.01)

(52) U.S. Cl. .............. 416/145; 415/119; 73/470

(58) Field of Classification Search ........... 416/144, 416/145; 73/470, 455, 456
See application file for complete search history.

(56) References Cited

U.S. PATENT DOCUMENTS

| | | | |
|---|---|---|---|
| 3,968,769 A | 7/1976 | Gusarov et al. | |
| 4,530,240 A | 7/1985 | Board et al. | |
| 4,888,948 A | 12/1989 | Fisher et al. | |
| 5,140,856 A | * 8/1992 | Larsen | 73/455 |
| 5,453,598 A | 9/1995 | Hackett et al. | |
| 5,493,763 A | 2/1996 | Yamanaka et al. | |
| 5,622,045 A | 4/1997 | Weimer et al. | |
| 5,676,025 A | * 10/1997 | Lulay | 74/570.2 |
| 5,757,662 A | 5/1998 | Dyer et al. | |
| 6,236,934 B1 | * 5/2001 | Dyer et al. | 701/124 |
| 6,350,224 B1 | * 2/2002 | Cordaro et al. | 494/7 |
| 6,364,581 B2 | 4/2002 | Dyer et al. | |
| 6,499,350 B1 | 12/2002 | Board et al. | |
| 6,618,646 B1 | 9/2003 | Dyer | |
| 6,680,554 B2 | 1/2004 | Krysinski et al. | |
| 6,720,885 B1 | 4/2004 | Lee et al. | |
| 6,725,985 B2 | 4/2004 | Haneishi et al. | |
| 6,736,246 B2 | 5/2004 | Haneishi et al. | |
| 6,768,938 B2 | 7/2004 | McBrien et al. | |
| 6,789,025 B2 | 9/2004 | Boerhout | |
| 6,883,373 B2 | 4/2005 | Dyer | |

(Continued)

FOREIGN PATENT DOCUMENTS

EP 0284392 A2 9/1988
EP 0284392 B1 9/1994

(Continued)

OTHER PUBLICATIONS

Balance Dynamics Corporation, "Dynamic News", pp. 1-3. Pre-filing date.

(Continued)

Primary Examiner — Richard Edgar
Assistant Examiner — Ryan Ellis
(74) Attorney, Agent, or Firm — Richard G. Miller

(57) ABSTRACT

A system for balancing an aircraft propeller system receives a vibration signal from the aircraft propeller system and determines whether the vibration signal indicates a transient vibration condition. If it is determined that the vibration signal does not indicate a transient condition, the system enables a balance correction controller. The controller generates a balance correction signal based on the vibration signal, and balances the aircraft propeller system in response to the balance correction signal if the balance correction controller is enabled.

20 Claims, 26 Drawing Sheets

U.S. PATENT DOCUMENTS

| | | | |
|---|---|---|---|
| 6,954,685 B2 * | 10/2005 | Altieri et al. | 701/3 |
| 7,155,973 B2 | 1/2007 | Dyer | |
| 2001/0005814 A1 | 6/2001 | Dussac | |
| 2002/0065139 A1 | 5/2002 | Krysinski et al. | |
| 2002/0193168 A1 | 12/2002 | Hosooka et al. | |
| 2003/0130811 A1 | 7/2003 | Boerhout | |
| 2004/0034483 A1 | 2/2004 | Sonnichsen et al. | |
| 2004/0092321 A1 | 5/2004 | Cermak | |
| 2004/0176902 A1 | 9/2004 | McBrien et al. | |
| 2004/0180726 A1 | 9/2004 | Freeman et al. | |
| 2004/0204872 A1 | 10/2004 | Kato | |
| 2005/0288885 A1 | 12/2005 | Zhang et al. | |
| 2006/0018725 A1 | 1/2006 | Ichino et al. | |

FOREIGN PATENT DOCUMENTS

| | | | |
|---|---|---|---|
| EP | 1610144 A | 12/2005 | |
| EP | 1621285 A | 2/2006 | |
| WO | 01075272 A3 | 10/2001 | |
| WO | 01/98745 A1 | 12/2001 | |

OTHER PUBLICATIONS http://www.maxim-ic.com/quick_view2.cfm/qv_pk/1798, Sep. 22, 2006.
Maxim, +5V-Powered, Multichannel RS-232 Drivers/Receivers, 19/4323; Rev. 15, Jan. 2006.
International Rectifier Catalog Search, Sep. 22, 2006.
International Rectifier, IR2110(-1-2)(S)PbF/IR2113(-1-2)(S){bF, Data Sheet No. PD60147, rev. U.
Honeywell Sensing and Control, SS443A product datasheet.
Honeywell/Microswitch—SS443A—Allied Electronics, Sep. 22, 2006.
Honeywell, Hall-Effect, Current, Force and Humidity Sensors, pp. 1117.
Ebay.at, 10x 74HC14, Inverting Schmitt Trigger, Motorola, Sep. 22, 2006.
Maxim, "MAX260, MAX261, MAX262, Microprocessor Programmable Universal Active Filters", Sep. 22, 2006.
Maxim, "Microprocessor Programmable Universal Active Filters", 19-0352; Rev. 2; Jul. 2002.
Winzenz, Active Balancing Developments for Power Generation, OMMI, vol. 1, No. 2, Aug. 2002.
DigChip.com, Electronics Components Database, Details and Datasheet on Part: TLC2202, Sep. 22, 2006.
Texas Instruments, Dual Low-Noise Precision Rail-to-Rail Operational Amplifier—TLC2202—TI Product Folder, Sep. 22, 2006.
Texas Instruments, Low-Noise Precision Rail-to-Rail Output Operational Amplifier—TLC2201—TI Product Folder, Sep. 22, 2006.
Texas Instruments, TLC220x, TLC220xA, TLC220xB, TLC220xY Advanecd LinCMOS(TM) Low-Noise Precision Operational Amplifiers, SLOS175, Feb. 1997.
ChipDocs, Datasheets for Electronic Components, PSD301-B-15 Series Datasheets, Sep. 22, 2006.
American Meteorological Society, AMS Journals Online, Journal of Atmospheric and Oceanic Technology, vol. 15, No. 1, pp. 46-53, Feb. 1998.
Semiconductors—Integrated Circuits, No. 8, Sep. 25, 2003.
Intel, MCS(R) 96 Microcontrollers—HSIO Family, Sep. 22, 2006.
Microcontrollers, 1126, Part 8—Embedded Controllers and Microprocessors, Sep. 22, 2006.
Kaydon, Engineered Solutions Based on Reali-Slim(R) Bearings: An Illustrated Mounting Guide, Bulletin No. 306, 2005.

* cited by examiner

AIRCRAFT WITH TRANSIENT-DISCRIMINATING PROPELLER BALANCING SYSTEM

CROSS REFERENCE

This application claims priority to U.S. Provisional Patent Application 60/829,019 filed Oct. 11, 2006, which is hereby incorporated by reference.

FIELD OF THE INVENTION

One embodiment of the present invention is directed to rotating devices. More particularly, one embodiment of the present invention is directed to an automatic balancing system for aircraft propellers.

BACKGROUND INFORMATION

Aircraft propeller systems, machine tool assemblies, turbo machinery, and other rotating equipment typically include a high speed rotating shaft, spindle, or other type of elongated member. These devices normally experience a certain amount of vibration caused by an imbalance in the propeller, tool, etc. The vibration, if not corrected, can cause the device to run inefficiently and ultimately fail.

Known balancing devices have been created and utilized in order to correct the imbalances. While somewhat effective, these prior art balancing devices and methodologies suffered from various drawbacks. For example many of these prior art balancers required that the tool assembly and/or rotating machinery be stopped or "interrupted" before a balance was achieved, which is relatively costly and highly inefficient.

Other known balancing systems are designed to correct an imbalance in rotating machinery while in operation. For example, the balancing system disclosed in U.S. Pat. No. 6,618,646 continuously monitors the state of balance of the rotating system, and can correct for imbalance while the rotating equipment is running. These "real-time" balancing systems typically rely on vibrations signals to determine whether balancing is required, and move balancing weights to rebalance.

However, these known real-time balancing systems do not properly account for short-term changes in vibration that may improperly indicate an imbalance situation. For example, in an aircraft propeller, wind buffeting and other turbulence, especially when the aircraft is taking off or landing, can result in rapid changes or transients in vibration that is not indicative of an imbalance situation. Prior art balancing systems, when detecting these transient changes in vibration, may still attempt to rebalance the propeller, even though this may be unnecessary. Such efforts may lead to an actual imbalance or at minimum an unnecessary movement of balance weights.

Based on the foregoing, there is a need for a system and method for real-time balancing that accounts for temporary erratic vibration transients.

SUMMARY OF THE INVENTION

One embodiment of the present invention is a system for balancing an aircraft propeller system. The system receives a vibration signal from the aircraft propeller system and determines whether the vibration signal is transient. If it is determined that the vibration signal is not transient, the system enables a balance correction controller. The system generates a balance correction signal at the balance correction controller based on the vibration signal and uses the balance correction signal to balance the aircraft propeller system if the balance correction controller is enabled.

DETAILED DESCRIPTION

One embodiment of the present invention is an aircraft propeller balancing system that detects and filters out transient vibration changes before automatically balancing the propeller.

Figure 1:
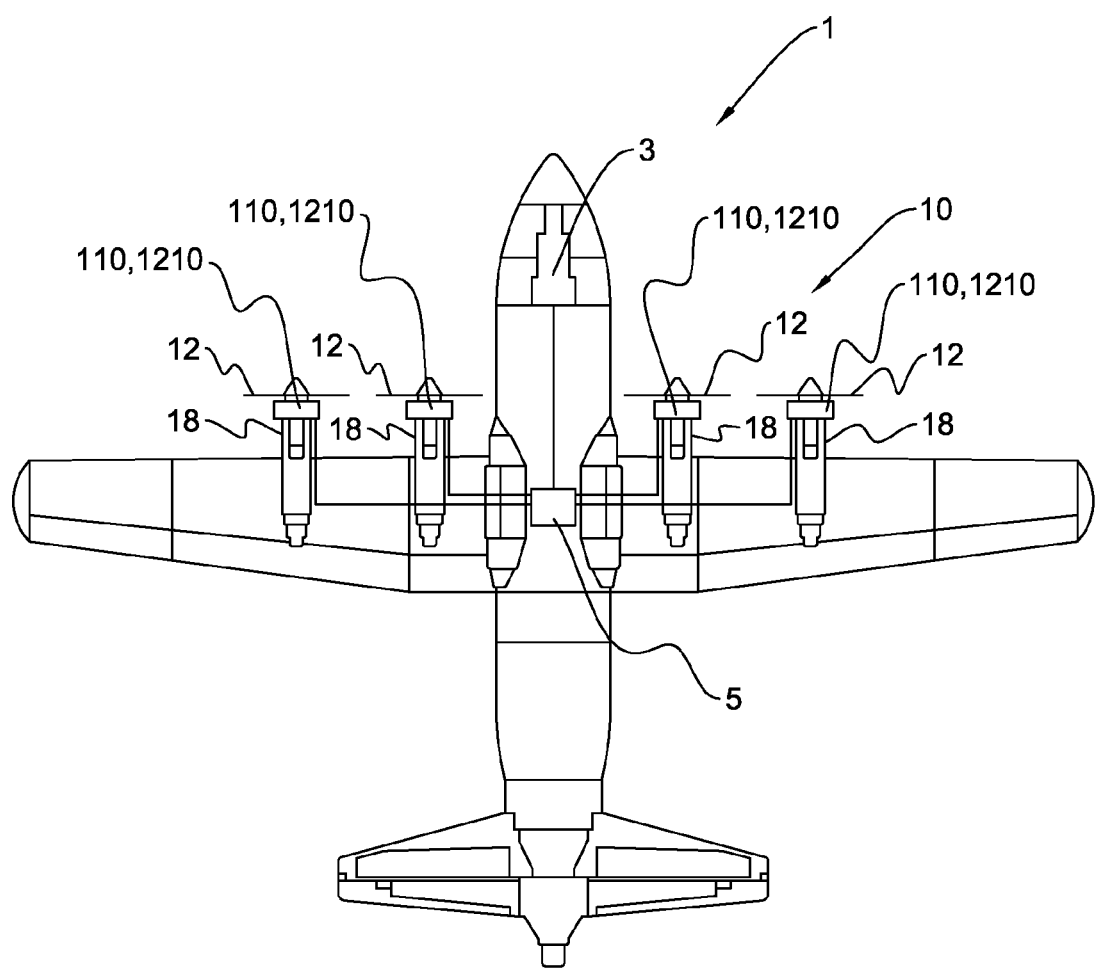
FIG. 1 is a bottom plan view of an aircraft equipped with an automatic propeller balancing system in accordance with one embodiment of the present invention.

FIG. 1 shows an aircraft 1 equipped with an automatic balancing system 10 in accordance with one embodiment of the present invention. In the embodiment shown, the aircraft 1 includes a plurality of propellers 12 and engines/gearboxes 18. The aircraft balancing system 10 can include a balancer assembly 110 coupled to each propeller 12. Each balancer assembly 110 is connected to and controlled by a balancer control system 5.

Figure 2:
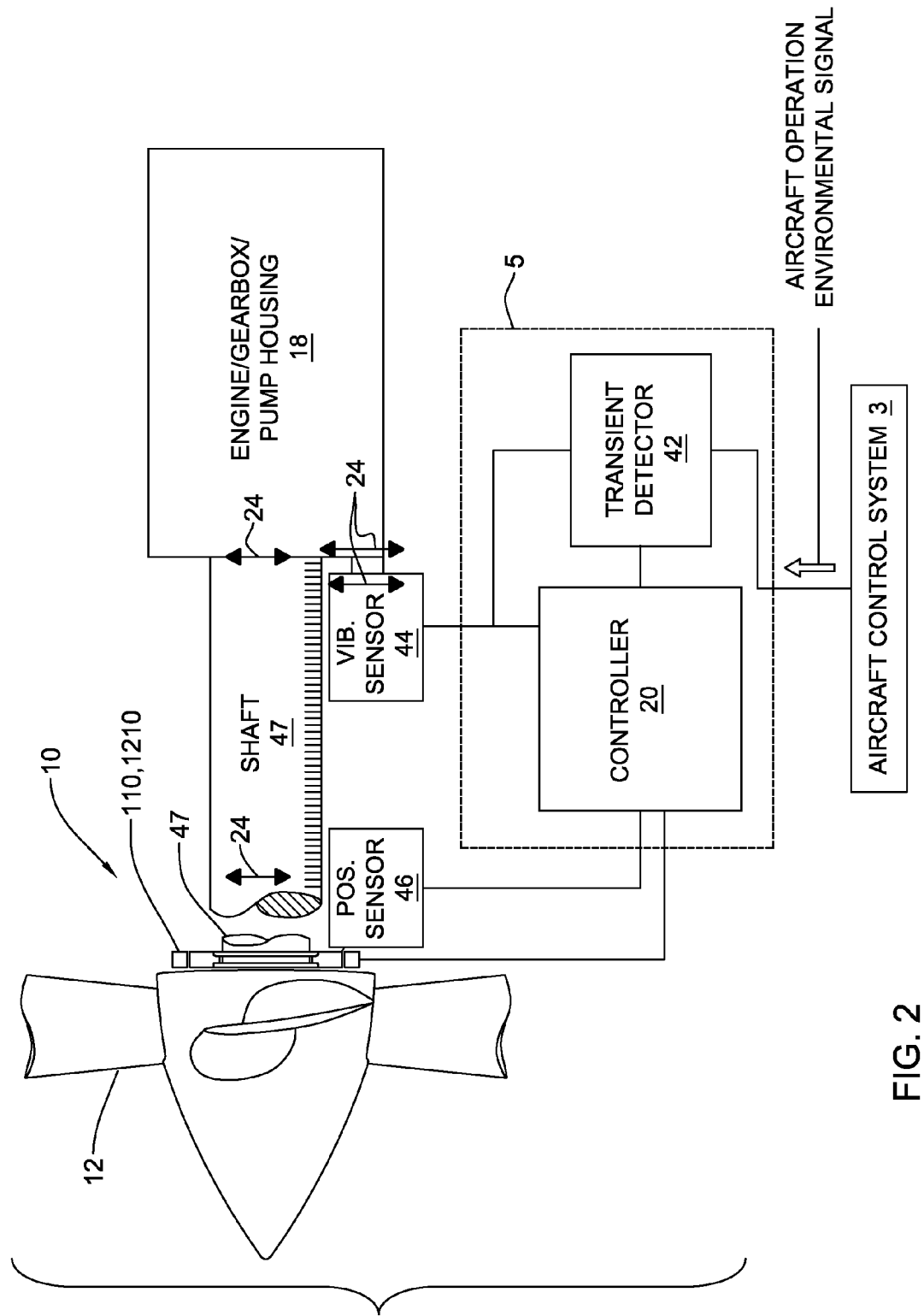
FIG. 2 is a schematic diagram showing an aircraft balancing system in accordance with one embodiment of the present invention.

FIG. 2 is an aircraft balancing system 10 in accordance with one embodiment of the present invention. Aircraft balancing system 10 is coupled to a propeller 12 that is rotated by a shaft 47 coupled to a propeller engine/gearbox 18. Propeller 12, shaft 47 and engine/gearbox 18 form an aircraft propeller system for an aircraft that produces motive power for the aircraft. As discussed above, in some instances, propeller 12 can become imbalanced due to, for example, feathering of the propeller blades and aerodynamic loading. Propellers 12 are unique sources of rotating shaft imbalance because significant degrees of imbalance can result from their variable blade pitch. Changes in the pitch of a propeller's blades can cause both mass imbalance and aerodynamic imbalance. In addition, an aircraft propeller 12 is subject to transient vibrations due to wind and other factors, especially during takeoffs and landings. These transient vibrations may indicate to prior art balancing systems that propeller 12 is imbalanced, thus causing an unnecessary balance correction.

One embodiment of a balancing system 10 according to the invention is configured to minimize or eliminate balance corrections in response to transient vibration conditions that are too temporary to merit correction. As shown in FIG. 2, the balancing system 10 can include a control system 5 that includes one or more vibration sensors 44 for detecting an imbalance condition in a propeller 12 and propeller shaft 47. Preferably, the vibration sensors 44 are located on or proximate to the engine/gearbox 18, preferably with the vibration sensor comprised of an accelerometer radially oriented on the engine/gearbox 18 to measure a vibration 24 lateral to the shaft 47 (radially oriented vibration sensor 44 measuring lateral shaft vibration 24). The balancing system can further include a controller 20 that controls operation of the balancer assembly 110, and a transient detector 42. The transient detector 42 is configured to identify detected vibrations that are too temporary to merit imbalance correction by the controller 20 and balancer assembly 110. As discussed in detail below, the control system 5 can further include one or more position sensors 46 for detecting the positions of adjustable balancing elements (not shown in FIG. 2) within the balancer assembly 110. Preferably, the position sensors 46 are located proximate to the balancer assembly 110 and proximate the balance correction ring rotors whose counter weight position is being measured, preferably with the position sensors 46 in the balancer assembly 110, preferably in the driver 220 (preferably Hall effect magnetic position sensors 2670-2672 stationary with respect to the rotating machine and mounted in close non-contacting proximity to the active balancer rotors, the output position sensor signals of the Hall effect device position sensors representative of shaft position and the positions of balancing ring rotors, magnetic position sensors producing a pulse that is proportional to the length of time that the particular position sensor is in proximity to the magnet targets located on the rotating balance ring rotors, with shaft speed computed by counting the rate of Hall effect sensor pulses caused by the passing rotating assembly magnetic target, and angular position of each rotor relative to the rotating assembly measured by the phase shift between sensor pulses caused by magnetic targets on each rotor and pulses caused by the rotating assembly magnetic target).

As discussed in detail below, the propeller balancer assembly 110 can include a plurality of balance correction rings or rotors that are coupled to the rotating shaft 47. The rotor rings are weighted, and are selectively moved or positioned using positioning magnets to cooperatively correct an imbalanced condition of rotating propeller 12 and shaft 47. Other embodiments of the present invention can utilize other known balance correction mechanisms instead of rotor rings for achieving shaft and propeller balance.

Figure 3:
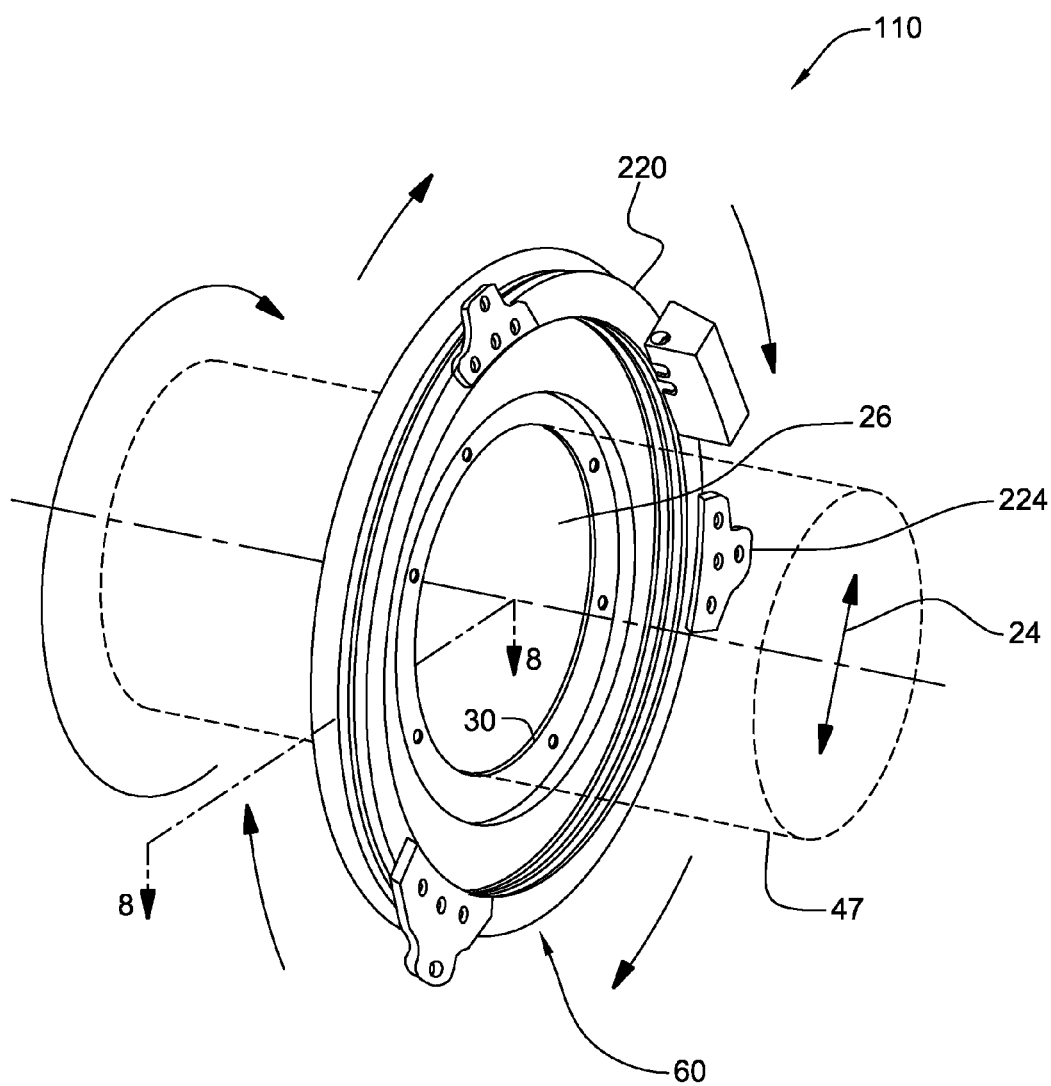
FIG. 3 is a perspective view of an active balancer on a rotating shaft.

FIGS. 3-30 show various embodiments of an active balance correction apparatus 110 and system 10 that can be used to establish and maintain shaft and propeller balance. As shown in FIG. 3, balancing system 10 includes an active balancer 110 for dynamically balancing a rotating propeller shaft 47. The balancer 110 includes a rotor assembly 60 which rotates with the shaft 47. As discussed in detail below, the balancer includes at least one controllable position counter weight that has an adjustable position relative to the shaft 47 in order to produce an adjustable controllable counter weight balance force for balancing the rotating shaft 47 in real time. The active balancer controllable position counter weight is electromagnetically positioned relative to the rotating shaft 47 with cooperating, repositionable balance rings (350, 351), and is moved relative to shaft 47 with a controllable electromagnetic field, such as produced by a driver magnetic flux (1510) and a plurality of permanent magnets (360, 361), as described herein below.

Figure 4:
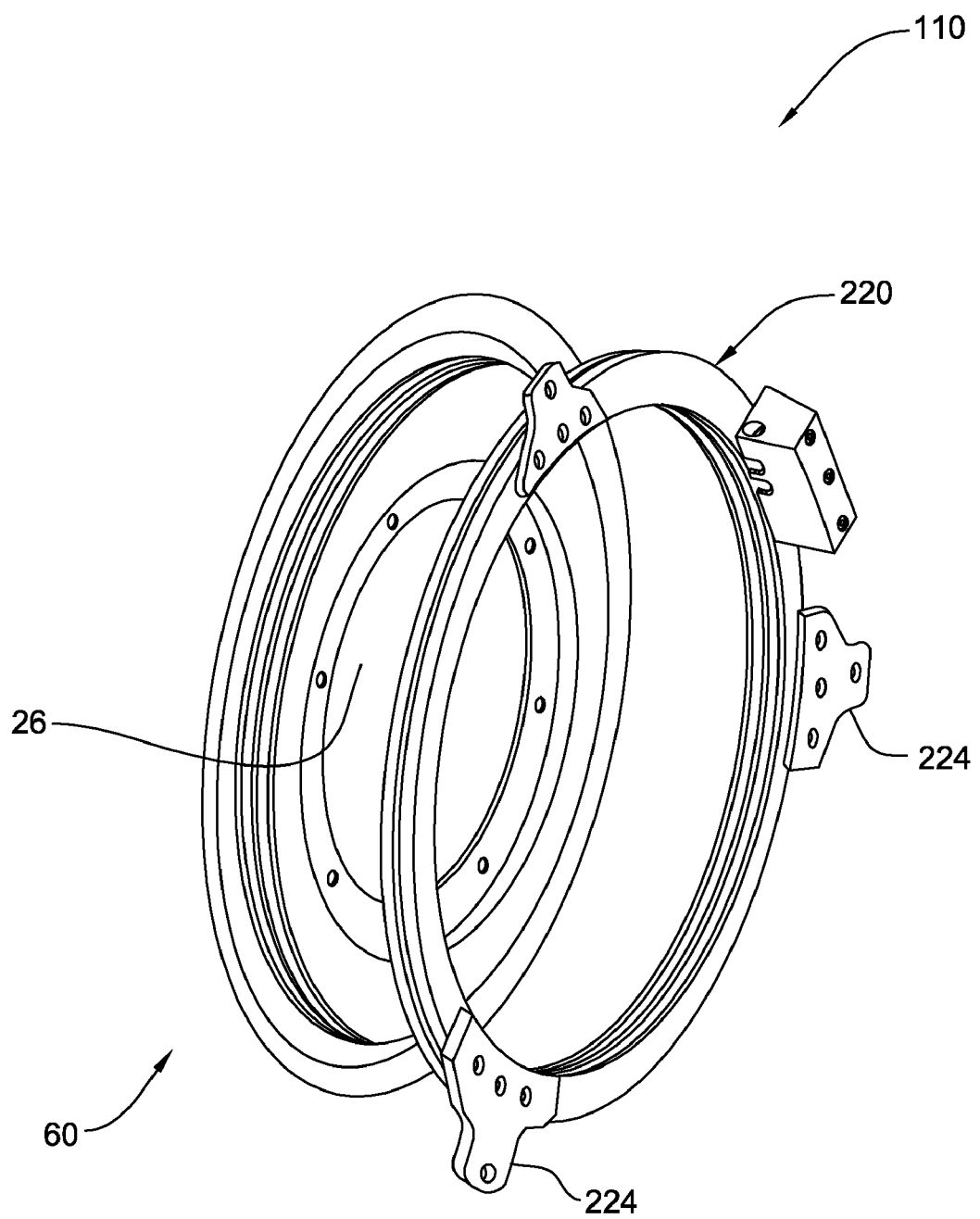
FIG. 4 is a perspective view of the automatic balancer assembly of FIG. 4 with the concentric driver separated from the balancing rotor assembly.

One embodiment of an automatic balancer assembly 110 is shown in FIGS. 3-8. As shown in FIGS. 3 and 4, one embodiment of the balancer assembly 110 includes a rotor assembly 60 that is coupled to a rotating propeller shaft 47. The rotor assembly 60 is affixed to the shaft by a mounting flange, or any other suitable means of connection. As explained in detail below, the rotor assembly can include one or more adjustable imbalance correction elements (not shown in FIGS. 3 and 4) that can be automatically adjusted to correct an imbalance vibration 24 in the propeller 12 and shaft 47. As also shown in FIGS. 3 and 4, the balancer assembly 110 can include a driver 220 for inducing desired movement of the imbalance correction elements within the rotor assembly 60. The driver 220 can include one or more mounting flanges 224 for fixing the driver 220 to a stationary, non-rotating portion of an aircraft or aircraft engine/gearbox. As shown in FIG. 3, in one embodiment, the driver 220 is concentric with the rotor assembly 60. Other embodiments of the present invention can utilize other known balance correction mechanisms for achieving shaft and propeller balance.

Figure 5:
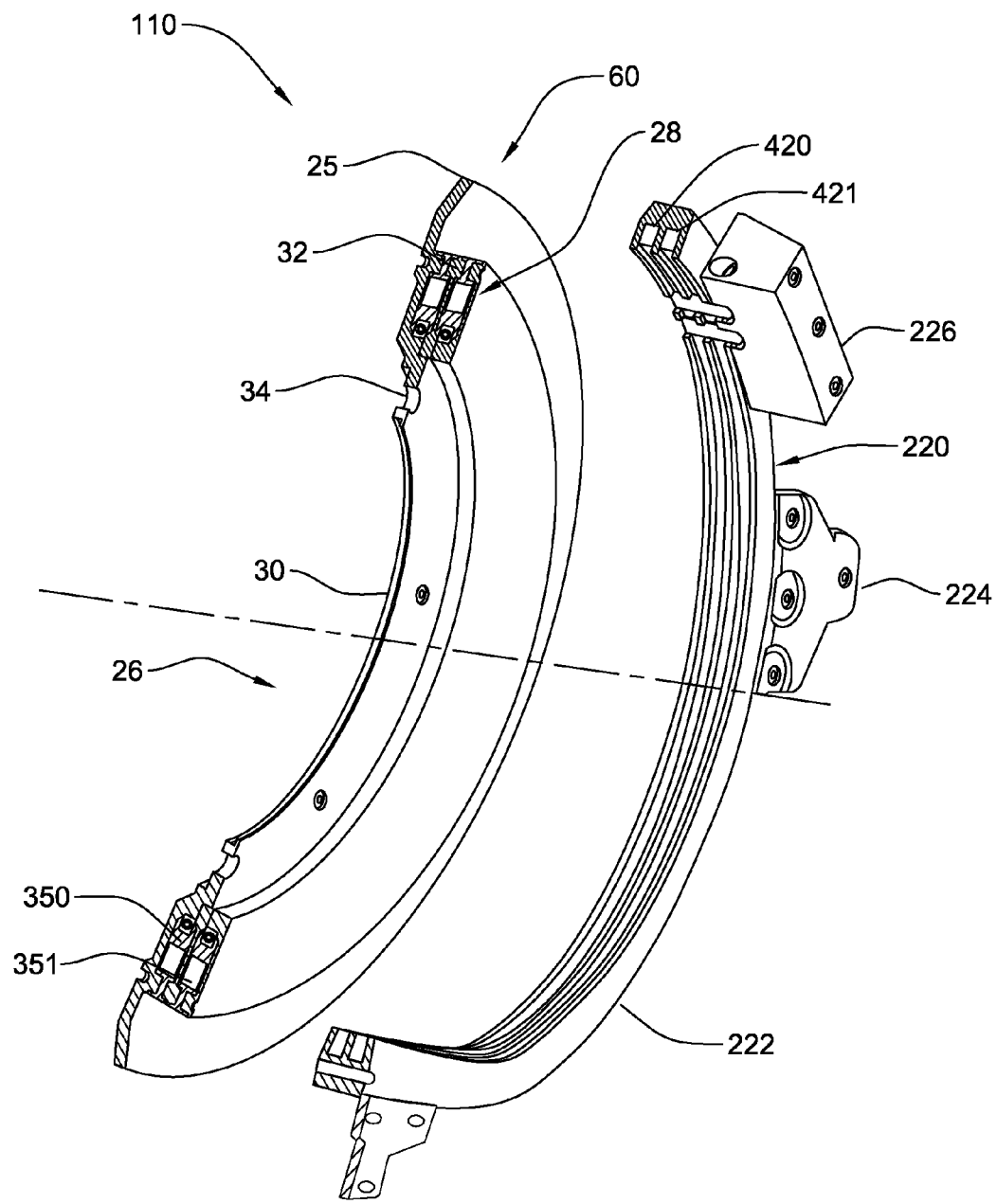
FIG. 5 is a cross section of the separated concentric driver and balancing rotor assembly shown in FIG. 4.
Figure 6:
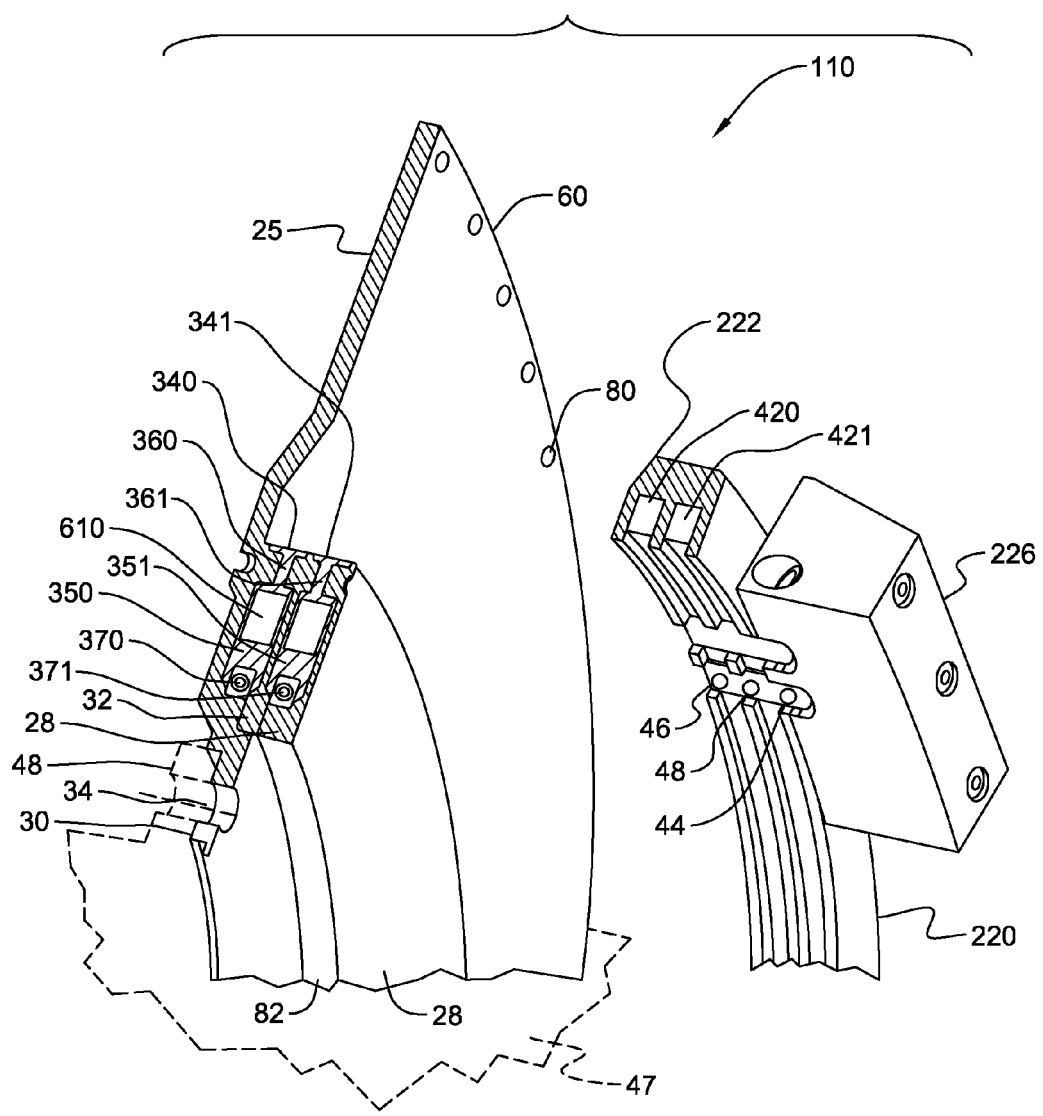
FIG. 6 is an enlarged view of a portion of the cross section shown in FIG. 5
Figure 7:
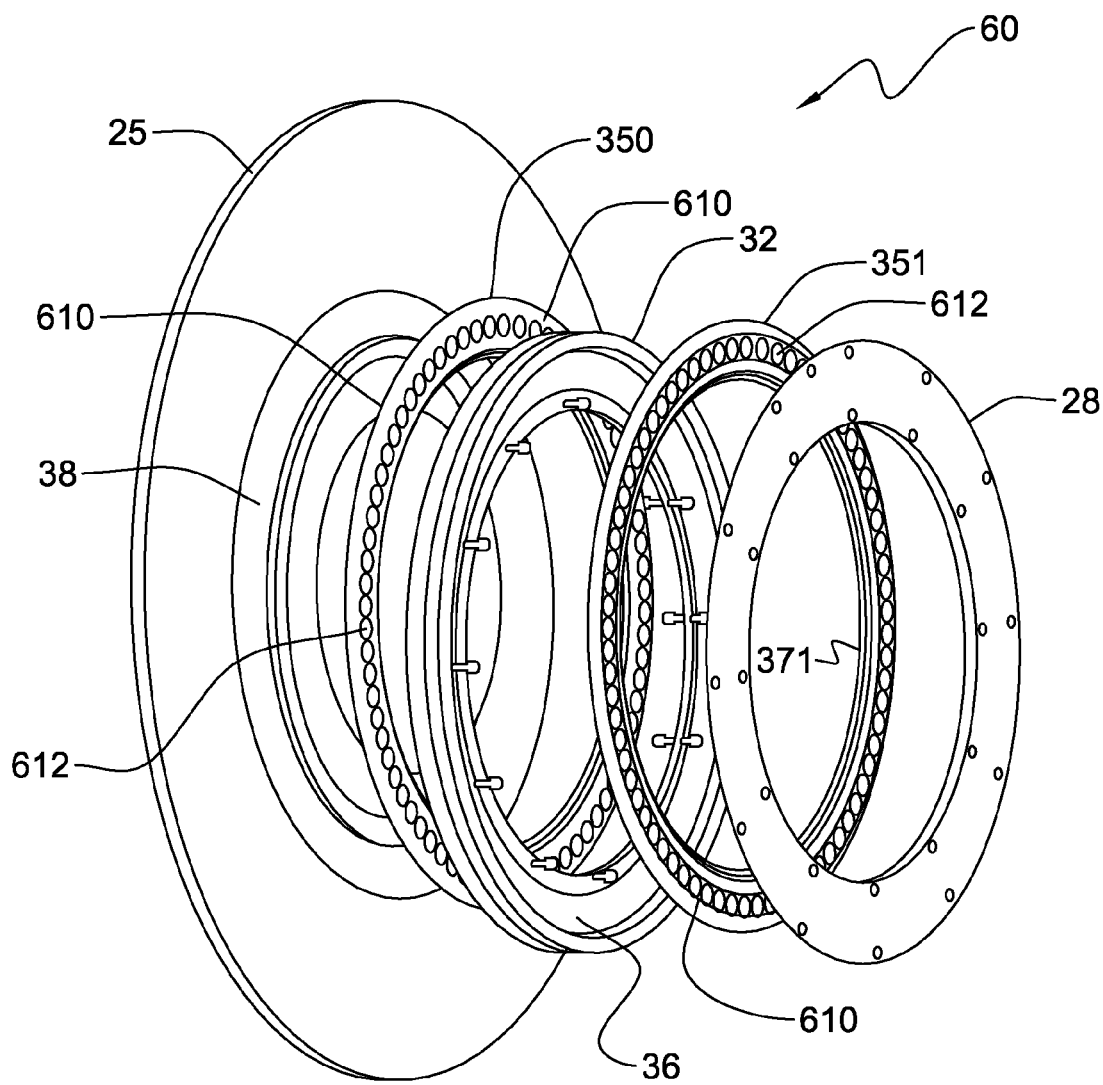
FIG. 7 is an exploded perspective view of the balancing rotor assembly shown in shown in FIGS. 3-6.
Figure 8:
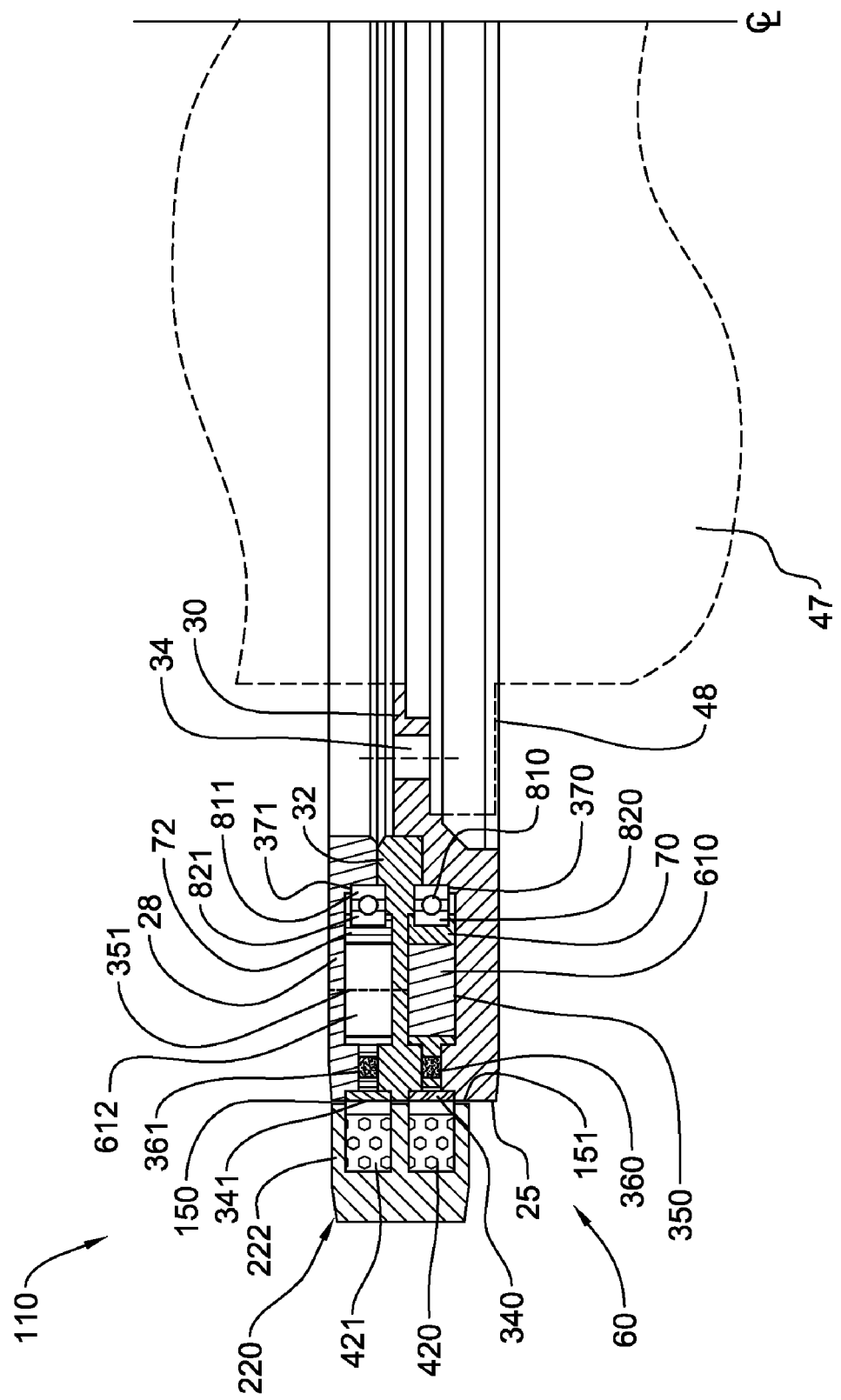
FIG. 8 is a partial cross section of the automatic balancer assembly taken along line 8-8 in FIG. 3.

Details of one embodiment of the balancer assembly 110 are shown in FIGS. 5-10. As shown in FIGS. 5-8, the rotor assembly 60 includes a rotor base plate 25, a first balancer ring 350, a rotor center plate 32, a second balancer ring 351, and a rotor cover plate 28. The rotor base plate 25 includes a central opening 26 for receiving a propeller shaft 47 therethrough. The base plate 25 can further include a rotor mounting flange 30 for affixing the base plate 25 to a cooperating portion 48 of the shaft 47. As shown in FIGS. 5 and 6, the flange 30 can include a plurality of spaced holes 34 for receiving mechanical fasteners for attaching the flange 30 and base plate 25 to the shaft 47. As shown in FIGS. 6-8, the first balancer ring 350 is disposed between the base plate 25 and the center plate 32. Clearances are provided between the first balancer ring 350 and surrounding portions of the base plate 25 and center plate 32 such that the first balancer ring 350 is free to rotate between the plates 25, 32. A first bearing 370 facilitates substantially free rotation of the first balancer ring 350 between the base plate 25 and center plate 32. As also shown in FIGS. 6-8, a second balancer ring 351 is disposed between the center plate 32 and the cover plate 28. Clearances are provided between the second balancer ring 351 and surrounding portions of the center plate 32 and cover plate 28 such that the second balancer ring 351 is free to rotate between the plates 32, 28. A second bearing 371 facilitates substantially free rotation of the second balancer ring 350 between the center plate 32 and cover plate 28. In one embodiment, the bearings 370, 371 are commercially available high performance ball bearing assemblies, such as thin section bearings. As shown in FIG. 6, the base plate 25, center plate 32, and cover plate can be interconnected by a plurality of mechanical fasteners 80, 82, such as screws or the like. As also shown in FIG. 6, a first non-electrically conductive spacer 340 can be positioned on the rotor assembly 60 about the outer diameter of the first balancer ring 350, and a second non-electrically conductive spacer 340 can be positioned on the rotor assembly 60 about the outer diameter of the second balancer ring 351.

FIGS. 5-8 also show details of one embodiment of a concentric driver 220. The driver includes a driver core 222, a first driver coil winding 420, and a second driver coil winding 421. The independent windings 420, 421 are spaced apart by a portion of the driver core 222, and are positioned proximate to the inner diameter of the core 222 such that gaps 150,151 exist between the windings 420, 421 and the inner diameter of the driver core 222. The driver core 222 comprises magnetic material and acts to concentrate and enhance electromagnetic field magnetic flux generated when electric current passes through the coil windings 420 and 421. The driver core 222 can be made from a single piece of magnetic material, or can be constructed by an assembly of separate components. In one embodiment, coil windings 420 and 421 include mutually insulated electrical wires wound to form two substantially independent coils. In FIG. 8, the direction of current flow is orthogonal to the plane of the paper on which the Figure appears. When current is selectively passed through the windings 420, 421, an electromagnetic field is generated which acts to displace one or both balance rings 350 and 351 in order to accomplish a desired degree of balance compensation.

As shown in FIG. 5, a plurality of driver mounting flanges 224 can be affixed to the driver core 222 for mounting the driver 220 to an adjacent stationary portion of an aircraft, such as to an adjacent pump housing or the like (not shown in the Figures). As shown in FIGS. 5 and 6, the driver 220 also can include a driver instrumentation module 226. As shown in FIG. 6, the driver 220 can include a first position sensor 46 associated with the first balancer ring 350, and a second position sensor 48 associated with the second balancer ring 351. The position sensors 46, 48 are configured to detect the angular orientations of their respective associated balancer ring 350, 351 relative to the rotor base plate 25 and a rotating shaft connected thereto. The driver also can include a vibration sensor 44 configured to detect vibration of the balancing rotor assembly 60 and a rotating shaft connected thereto.

Figure 9:
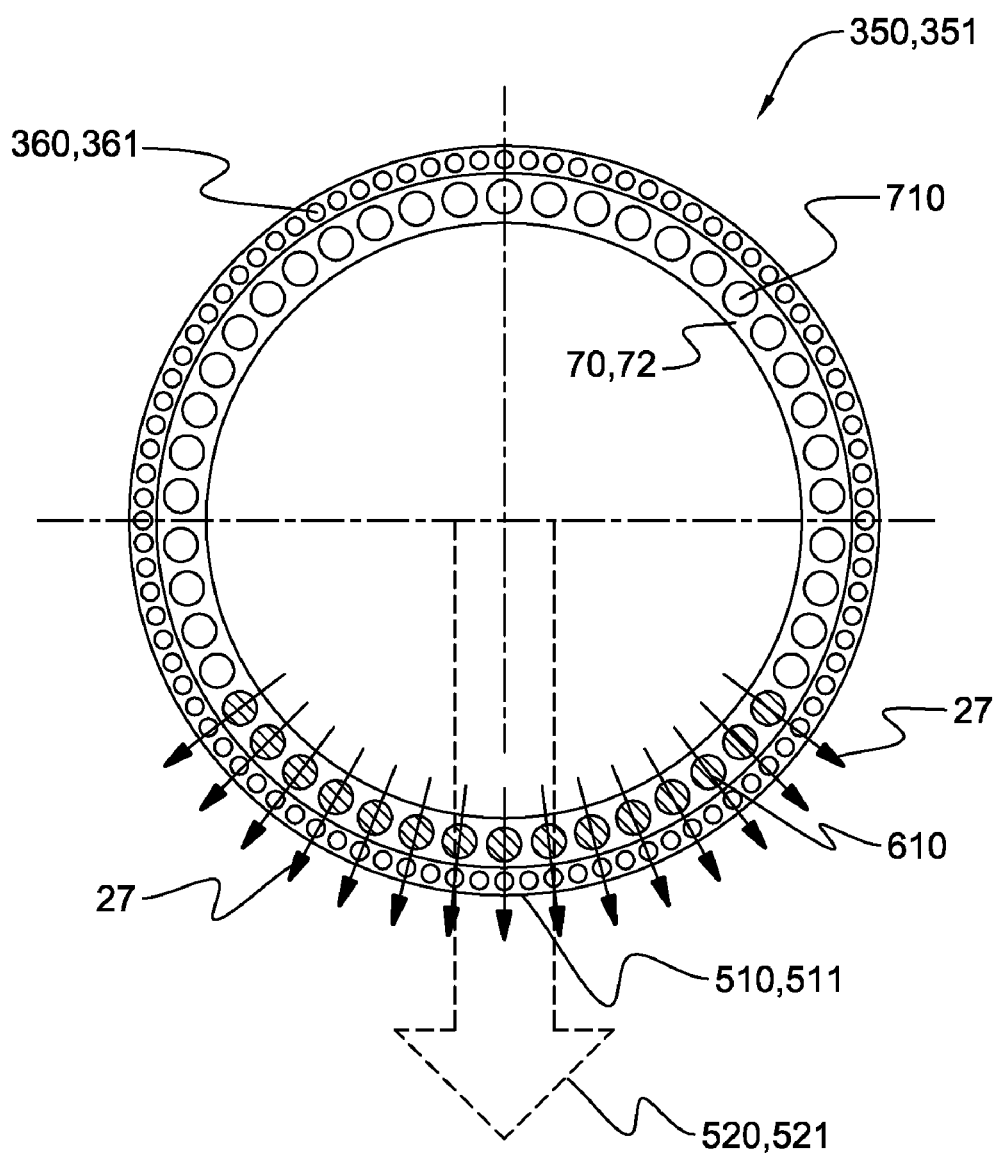
FIG. 9 is a front view of a rotor showing a configuration of weighted inserts that provide unbalance to the rotor.

One embodiment of a first balancer ring 350 is shown in FIG. 9. In this embodiment, the first balancer ring 350 includes a first rotor disc having a substantially circular shape and being made or formed from stainless steel, aluminum, or another non-magnetic material. The first rotor disc 70 may have an outer diameter and width of desired and selected dimensions. In one embodiment, the outer diameter and width are respectively about 6.0 inches and about 0.3 inches. The first balancer ring 350 can include a plurality of first permanent magnets 360 that are equally spaced and peripherally mounted in the rotor disc 70, remote from an associated propeller shaft 47. The permanent magnets 360 are mounted such that their magnetic polarity is oriented parallel to the axis of shaft rotation. In addition, each of the magnets 360 has a polarity that is opposite from each adjacent magnet 360. The rotor disc 70 also includes a plurality of spaced openings 710 proximate to its inner diameter. A plurality of weight inserts 610 are received in a portion of the openings 710 on a common side of the disc 70. As shown in FIG. 9, the weight inserts 610 cause the first balancer ring 350 to have a heavy portion 510 that is heavier than an opposite side of the balancer ring 350. As the first balancer ring 350 rotates about its axis, each of the weight inserts 610 has an associated imbalance vector 27. As shown in FIG. 9, these imbalance vectors 27 combine to provide the first balancer ring 350 with a first net imbalance vector 520. As also shown in FIG. 9, the second balancer ring 351 can be identical to the first balancer ring 350. The second balancer ring 351 includes a second rotor disc 72, a plurality of second permanent magnets 361, a plurality of openings 710 and weighted inserts 610, a second heavy portion 511, and a net imbalance vector 521.

Figure 10:
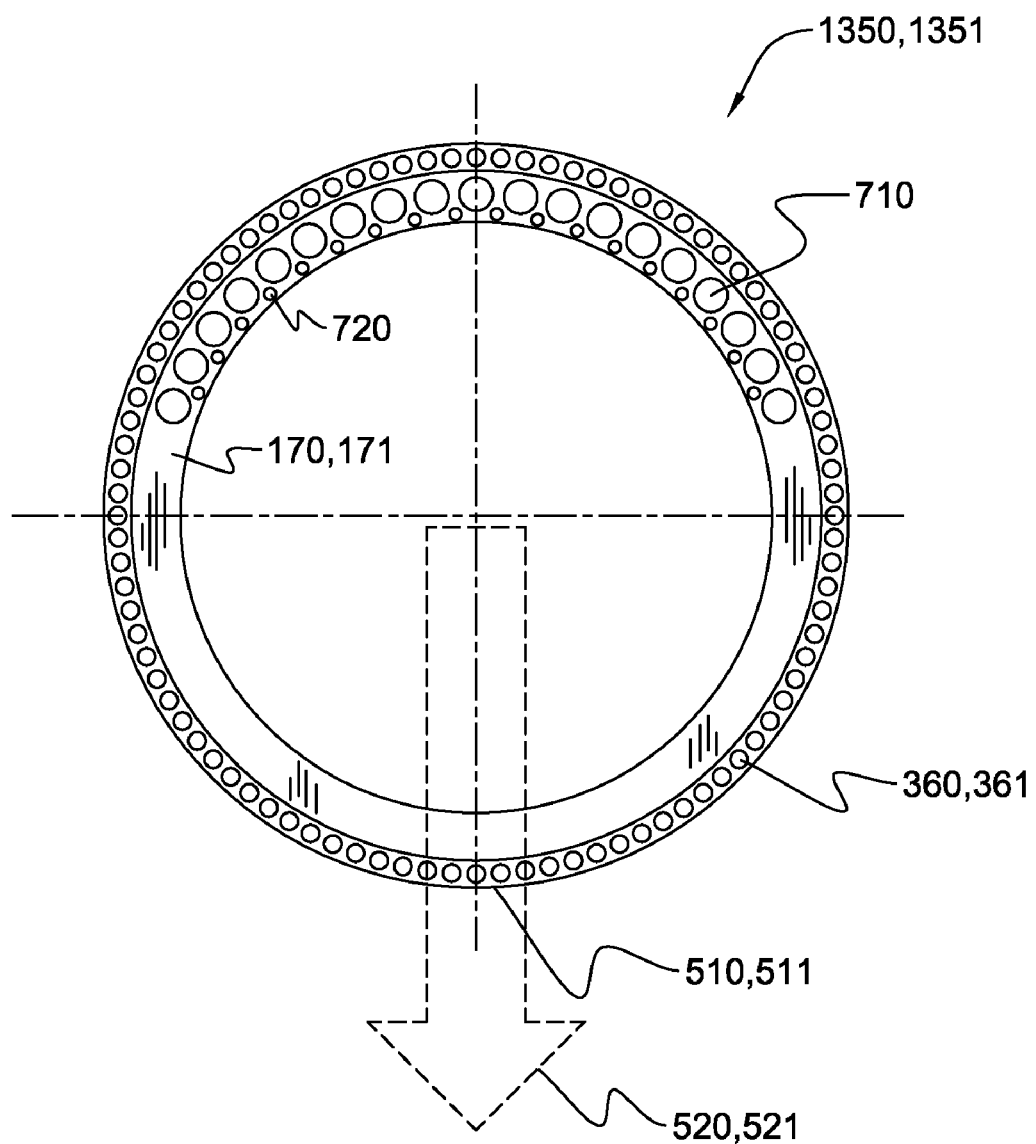
FIG. 10 is a front view of a rotor showing a configuration of machined holes that provide unbalance to the rotor.

FIG. 10 shows alternative embodiments of first and second balancer rings 350, 351. In this embodiment, rotor discs 170, 171 include a plurality of spaced large openings 710 and a plurality of spaced small openings 720 arranged along one side of the discs 170, 171. In this embodiment, the absence of openings 710, 720 along an opposite side of the discs 170, 171 causes the balancer rings 350, 351 to have respective heavy portions 510, 511, and respective net imbalance vectors 520, 521 like the weighted rings 350, 351 described above, but without weighted inserts 610.

FIG. 8 is a partial cross-sectional view showing the concentric driver 220 and rotor assembly 60 previously described and shown in FIGS. 3-7. As shown in FIG. 8, the driver 220 is positioned such that first winding 420 aligns with first balancer ring 350, and second winding 421 aligns with second balancer ring 351. As also shown in FIG. 8, each of the balancer rings 350, 351 is separated from its respective associated winding 420, 421 by an air gap 150, 151 and a spacer 340, 341. Accordingly, the first winding 420 is operable to impart selective rotational displacement of the first balancer ring 350, and the second winding 421 is operable to impart selective rotational displacement of the second balancer ring 351.

Figure 11:
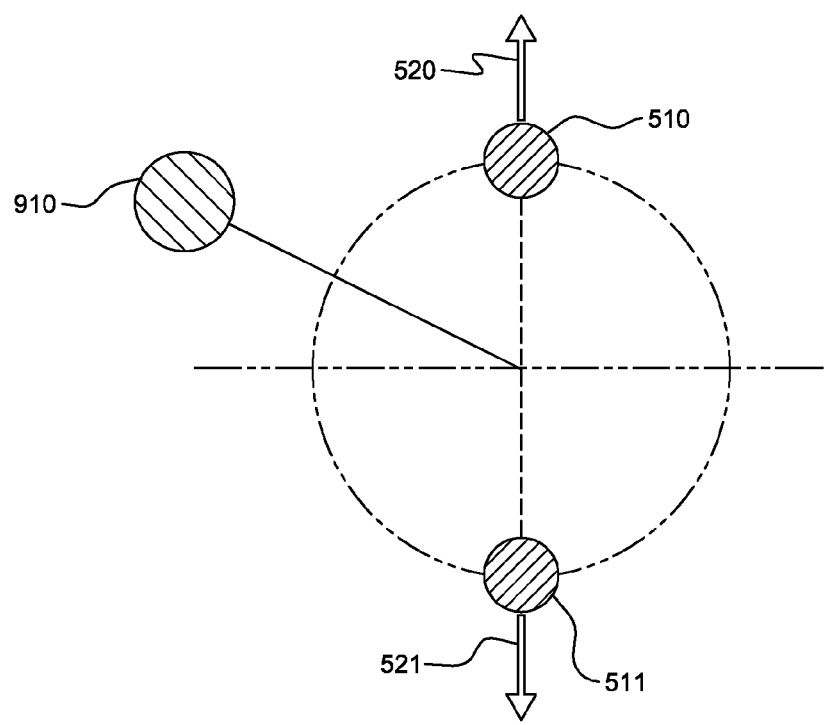
FIG. 11 is a diagrammatic representation of an initial neutral balancer configuration on an unbalanced rotating apparatus.
Figure 12:
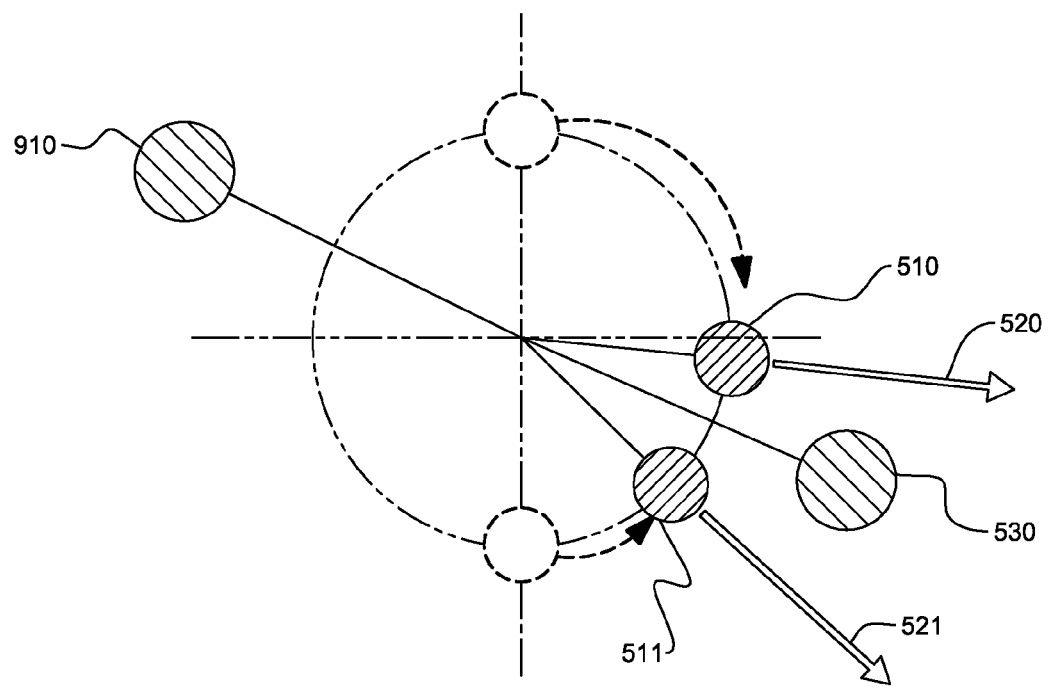
FIG. 12 is a diagrammatic representation of how, after balancing, the rotor ring unbalances combine to correct the apparatus imbalance.
Figure 13:
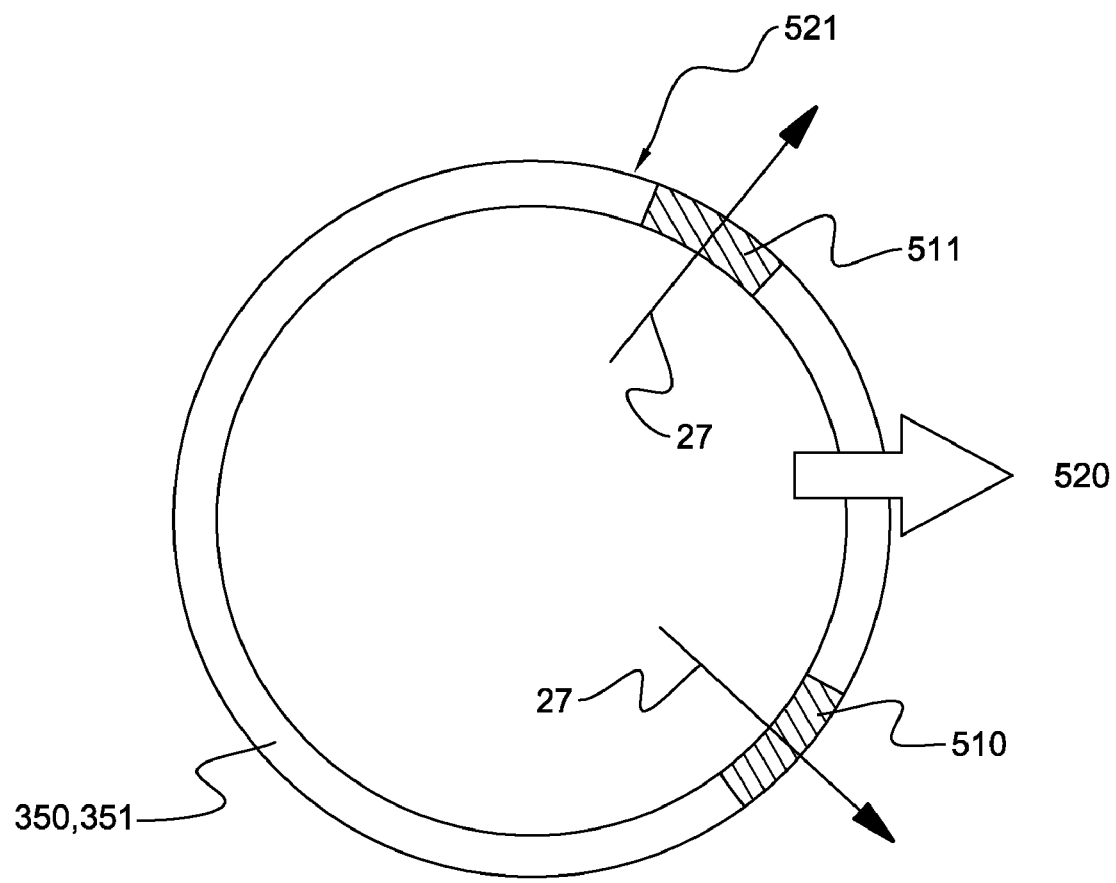
FIG. 13 is a diagrammatic view of balancer rotor rings.

To understand how balancer rings 350, 351 operate to correct an imbalance of an associated propeller shaft, reference is now made to FIGS. 11-13. It should be realized that, to allow for maximum balancing capacity, balancer 110 should be balanced or "quiescent" about the shaft axis of rotation except when a balance correction is required. As shown in FIG. 11, when the heavy portions 510, 511 of balance rings 350, 351 are positioned 180 degrees from each other, the net ring imbalance vectors 520, 521 act in opposite directions, thereby creating "neutral" balance configuration.

Thus, the ring unbalances 510-511 can be initially positioned 180 degrees opposite each to provide no effective balance correction. As further shown in FIG. 11, a propeller unbalance 910 can be estimated by the control system 5. In order to compensate for the unbalance 910, the balance rings 350-351 and their respective heavy spots 510, 511 each can be selectively rotated to new positions as shown in FIG. 12. The balance ring heavy spots 510, 511 are positioned such that they create an effective balance correction vector 530 that is substantially opposite in position and substantially equal in magnitude to propeller unbalance 910. This condition then results in a real time dynamically balanced propeller, thus substantially eliminating a major source of unbalance vibration.

As shown in FIG. 13, each balance ring 350, 351 has an identifiable position represented by a certain respective angle measured with respect to a fixed arbitrary reference point. Moreover, each balance ring 350, 351 has a certain predetermined imbalance magnitude 510, 511 associated with it. The respective imbalance magnitudes 510, 511, in combination with the angular position, define a vector having a directional component fixed by the angular position and a magnitude fixed by the amount of imbalance. A net correction vector 520 results from the vector addition of the two vectors 510 and 511. The net correction vector 520 can be calculated using trigonometry knowing the magnitudes and angular position of the effective weight of each balance ring 350, 351, or each balance ring's individual "unbalance" vector.

Figure 14:
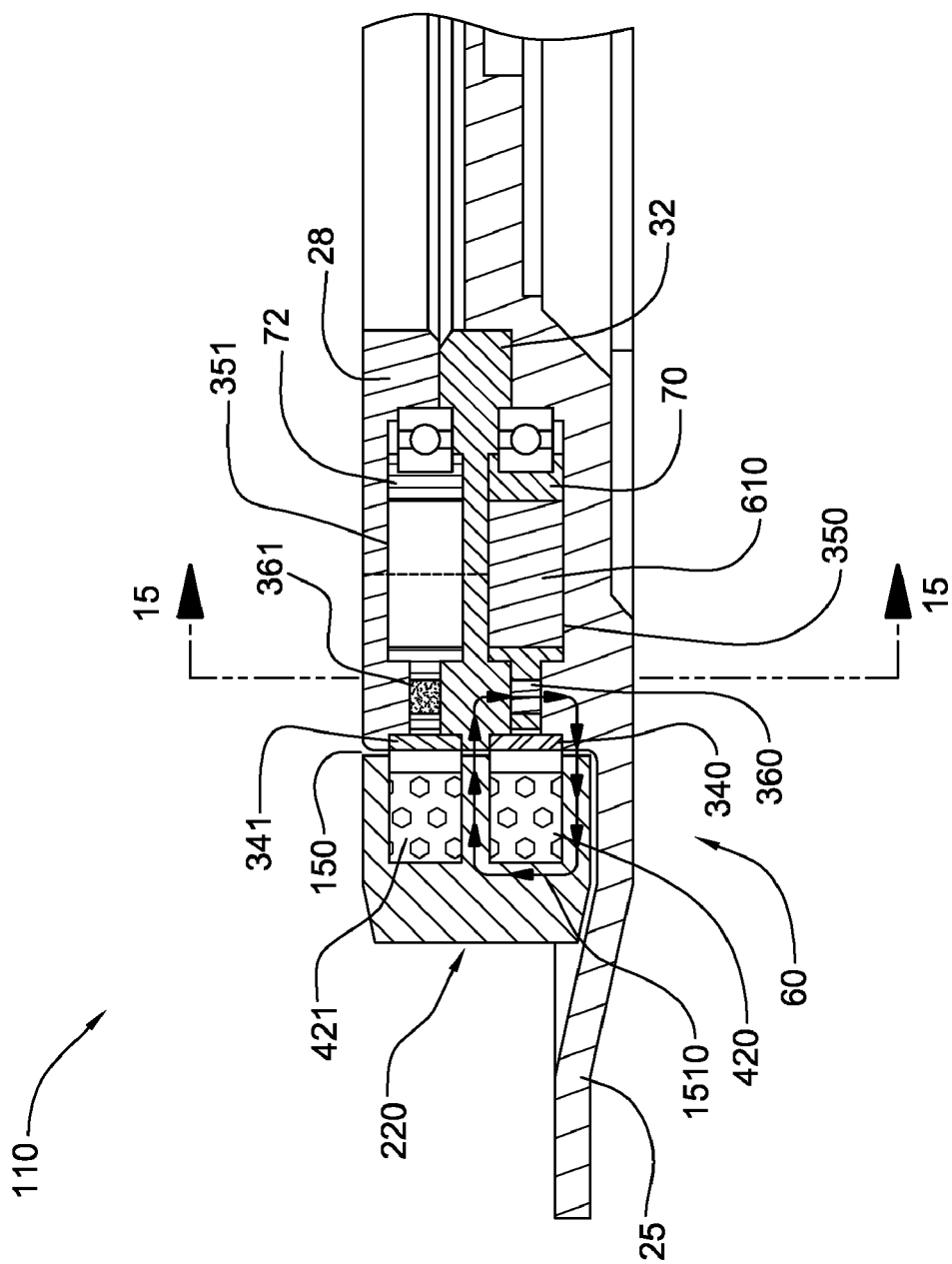
FIG. 14 is a side and partial cut-away view of a balancer and driver showing the driver magnetic field flux path.
Figure 15:
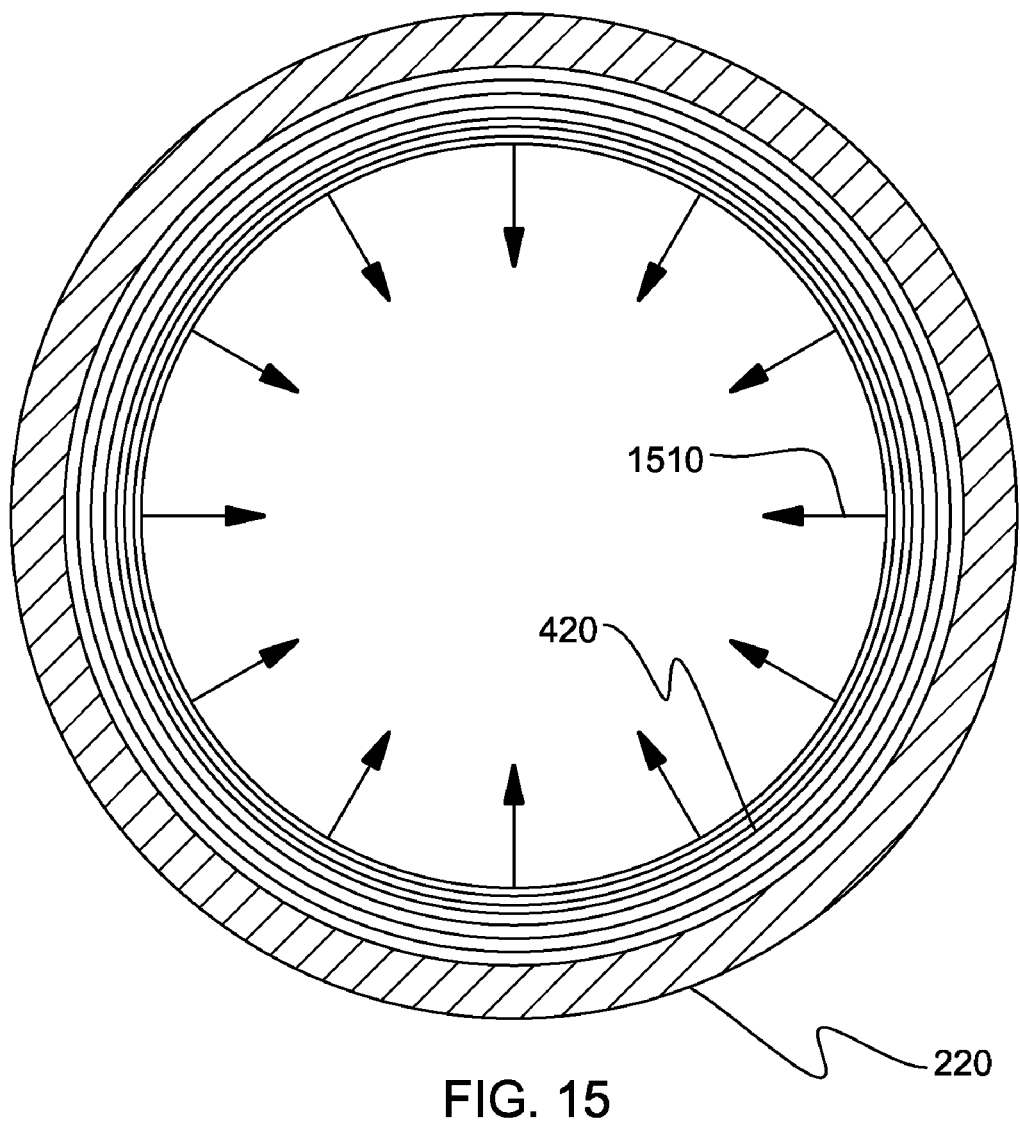
FIG. 15 is a front and partial cut-away view of a balancer driver.

FIG. 14 is a partial cross-sectional view of the balancer 110 showing a magnetic flux path 1510 generated when the first coil winding 420 is energized. The magnetic flux crosses the air gap 150 between the driver 220 and the balance rotor assembly 60, and passes through the permanent magnets 360 in the first balancer ring 350. Each coil winding 420, 421 can be independently energized, effecting magnetic circuits passing through either balance ring 350, 351. A cross-section view of the concentric driver 220 is shown in FIG. 15. Also shown are the magnetic flux lines 1510 induced by the drive coil 420 parallel to the plane of the page.

Figure 16:
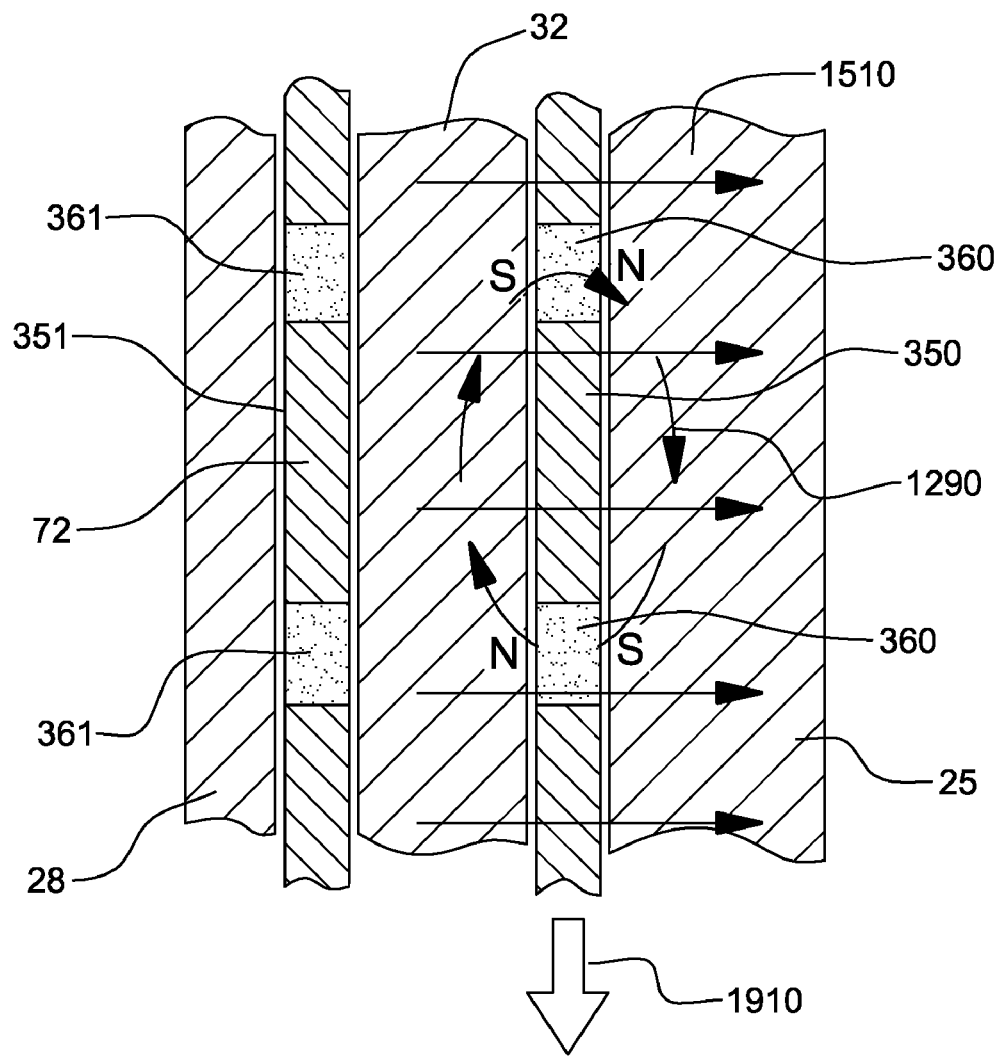
FIG. 16 illustrates the interaction of the driver magnetic field and the permanent magnet field.

A cross-section view of the concentric driver 220 is shown in FIG. 16. Also shown are the magnetic flux lines 1510 induced by the drive coil 420 parallel to the plane of the page. The concentric driver core 410 is, in one embodiment of the invention, about one inch thick in the radial direction and has substantially the same axial thickness as the balancer rotating assembly 130. FIG. 16 shows the magnetic driver flux 1510 produced by the first winding 420 interacting with the magnetic field 1210 produced by the permanent magnets 360 of the first balancer ring 350. The driver flux path 1510 crosses through the rotating balancer ring 350 and through the permanent magnets 360. Such field interaction creates a force 1910 on the balance ring 350 in a direction perpendicular to the driver-generated magnetic field. The force 1910 exerted on the permanent magnets 360 thus creates a torque on the balance ring 350 that causes the balance ring to rotate in the direction of force 1910. Accordingly, the winding magnetic flux field 1510 can be selectively generated in order to impart a rotational force 1910 to the first balancer ring 350 and to cause the first balancer ring 350 to rotate to a desired angular orientation. Once the balance ring 350 is moved to a desired position, the first winding coil is de-energized, thus removing the rotational force 1910. Similarly, a magnetic flux selectively generated by the second winding 421 can be used to impart a rotational force to the second balancer ring 351 and to cause the second balancer ring 351 to rotate to a desired angular orientation. In this way, the driver windings 420, 421 can be used to selectively position each balance ring 350, 351 at a desired angular orientation in order to effect a desired net unbalance correction vector 530 like that shown in FIG. 12. When the windings 420, 421 are de-energized, the magnetic flux 1290 of the permanent magnets 360, 361 acts to hold the balancer rings 350, 351 in there desired angular orientations until another imbalance correction is required. Preferably the magnetic flux 1290 of the permanent magnets 360, 361 locks the balancer rings 350, 351 in their respective angular orientations during a power failure of the balancing system and/or an electrical power system outage in the aircraft. Accordingly, the magnets 360, 361 inhibit rotor movement in the absence of electrical control power, and inhibit any change in their balanced configuration in the event electrical power is lost.

Figure 17:
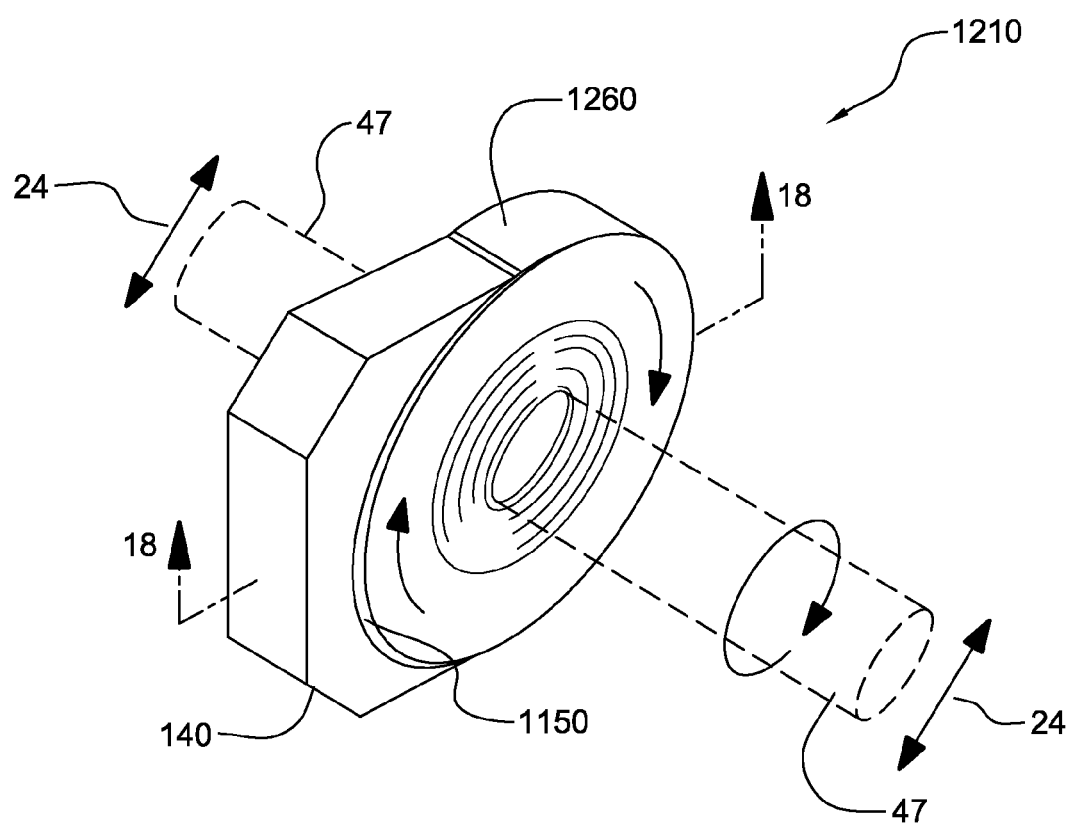
FIG. 17 is a perspective view of another embodiment of an active balancer on a rotating shaft.
Figure 18:
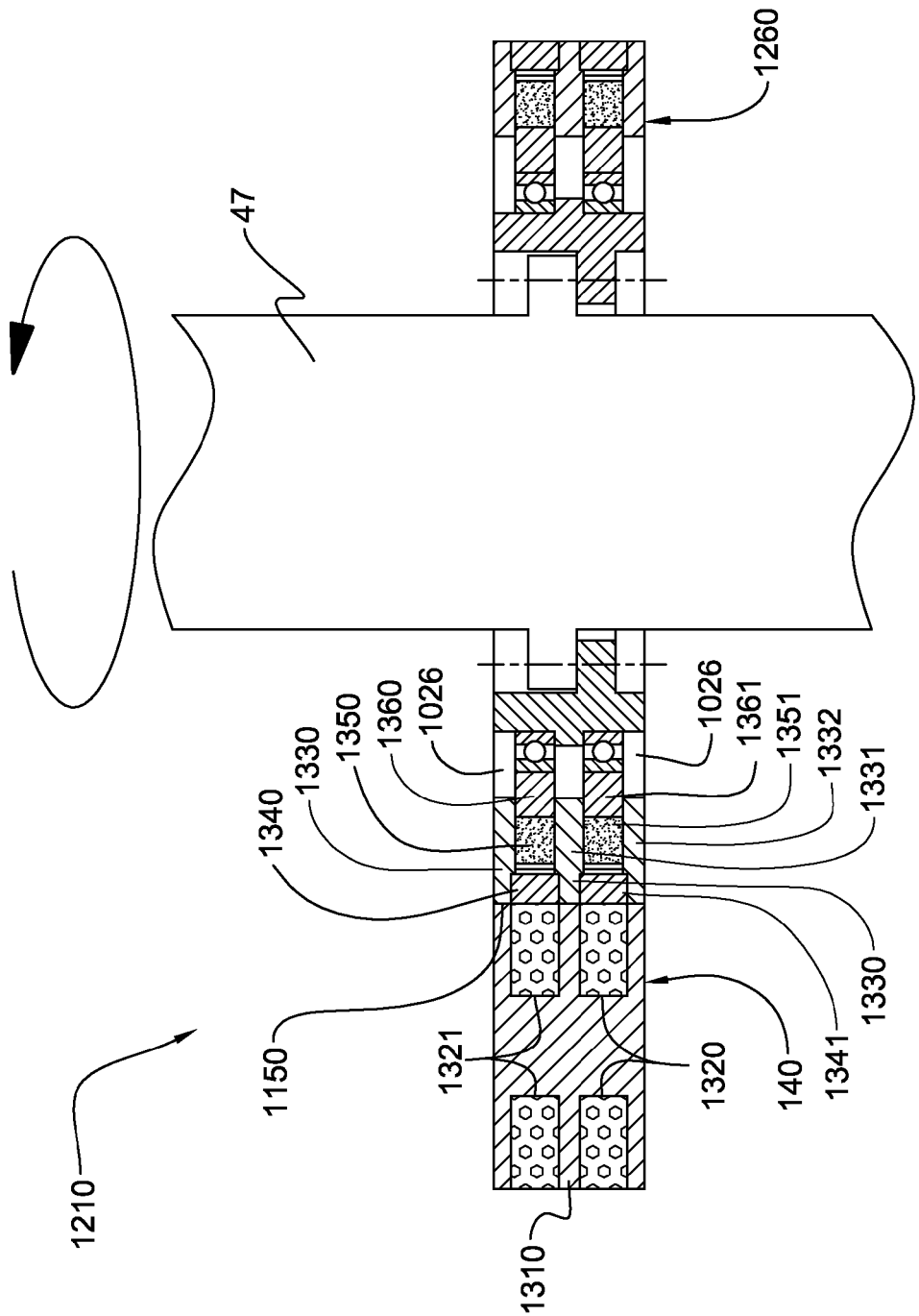
FIG. 18 is a cross-sectional view of the balancer assembly of FIG. 17 taken along line 18-18 in FIG. 17.
Figure 19:
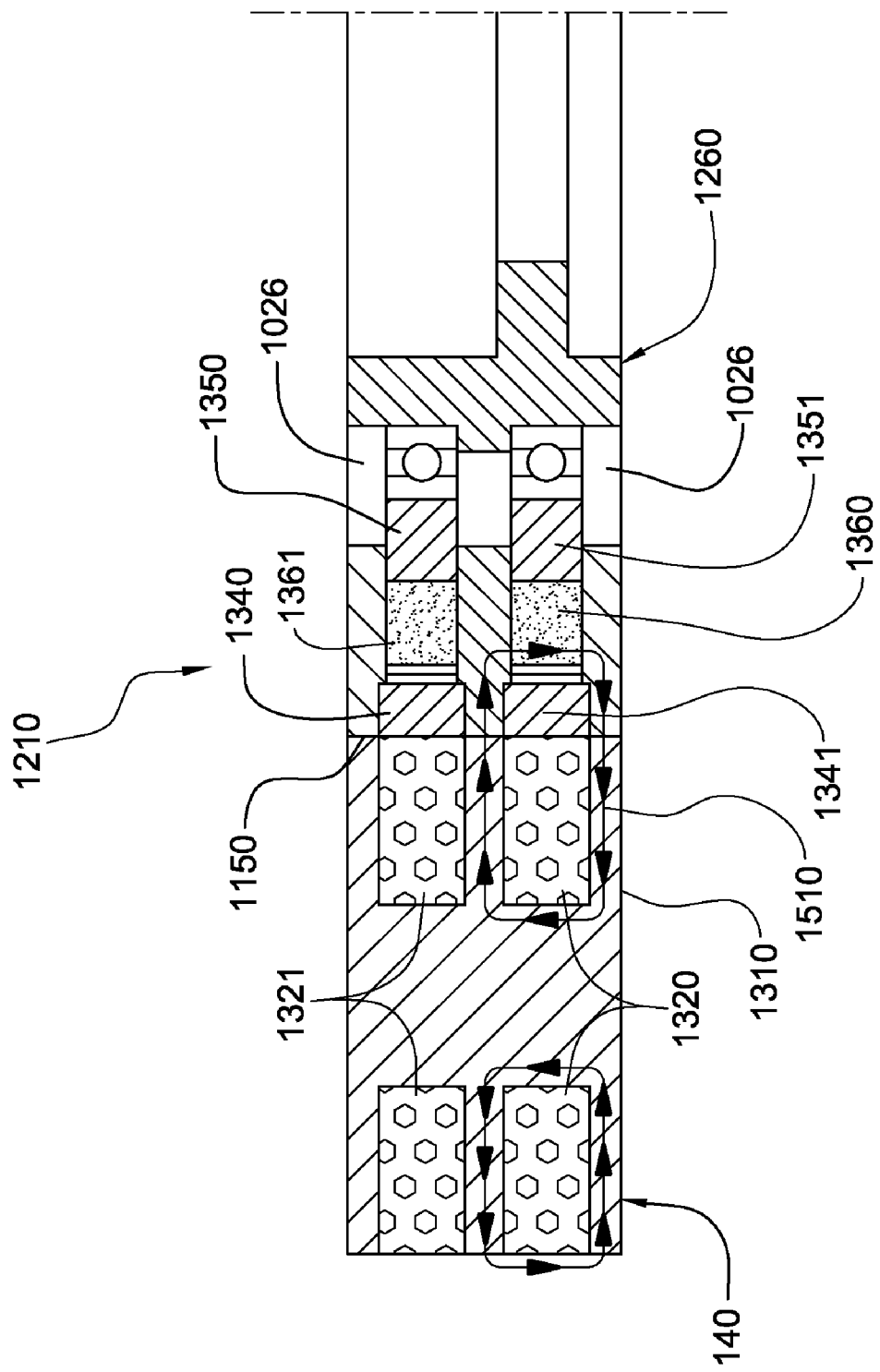
FIG. 19 is a side and partial cross-sectional view of a balancer and driver showing the driver magnetic field flux path.

FIGS. 17-19 show another embodiment of an active balancer 1210 according to the invention. As shown in FIG. 17, the balancer 1210 includes a side-mounted driver 140 and a balancer body 1260 affixed to a rotating shaft 47. The driver 140 is fixed to a stationary portion of an aircraft such that the driver 140 is stationary relative to the rotating shaft 47. The driver 140 and balancer body 1260 are separated by an air gap 1150. As shown in FIG. 18, the driver 140 includes a driver core 1310 and two independent electrical coil windings 1320 and 1321. The driver core 1310 comprises magnetic material and acts to concentrate and enhance electromagnetic field magnetic flux generated when electric current passes through the coil windings 1320 and 1321. The driver core 1310 could be made from a single piece of magnetic material or consist of an assembly of components. In one embodiment, coil windings 1320 and 1321 include mutually insulated electrical wire wound in a manner that forms two substantially independent coils. Referring to FIG. 18, the direction of current flow in windings 1320, 1321 is orthogonal to the plane of the paper on which the Figure appears. When current is passed selectively through these windings, an electromagnetic field is generated which causes rotor assemblies 1350 and 1351 to rotate in a manner similar to that described above regarding balance plates 350, 351 in order to effect a desired degree of balance compensation. As shown in FIG. 18, rotating balancer body 1260 includes generally circular and substantially similarly shaped pole plates 1330, 1331, and 1332. The pole plates 1330, 1331 and 1332 are separated by generally circular and mutually similarly shaped non-magnetic and preferably non-electrically conductive spacers 1340 and 1341. Spacers 1340 and 1341 can be axially symmetric annular aluminum or stainless steel rings of rectangular cross-section. The rectangular cross-section of the spacers 1340, 1341 can have sides about ¼ inch long. The outer radius of the spacers 1340, 1341 should be substantially the same as the outer radius of the pole plates 1330-1332. Situated between, and in non-contacting proximity to the pole plates 1330-1332, are the controllable position counter weight rotors 1350 and 1351. The plates 1330-1332, spacers 1340-1341, and controllable position counter weight rotors 1350-1351 may also have different geometric shapes from those shown and described. However, in one embodiment of the invention, plates 1330-1332 are all approximately the same size and shape. Spacers 1340-1341 can also have mutually similar geometry, as can controllable position counter weight rotors 1350-1351. The controllable position counter weight rotor geometry, however, is modified so that each rotor is unbalanced about its own centerline. Driver 14020 electromagnetically causes the weighted rotors 1350, 1351 and their accompanying "heavy spots" to rotate with respect to the balancer body 25 and the connected shaft 47 in accordance with stored control software and in accordance with certain measured quantities.

FIG. 19 shows the concentric driver 140 interacting with the rotating balancer body 1260. Note that the flux path 1510 produced by winding 1320 passes through the rotating balancer body and through the permanent magnets 1360, 1361 in a manner similar to that described above regarding FIG. 14. As can be seen by comparing FIG. 19 to FIG. 14, the concentric driver 220 described above is more electromagnetically efficient than the side-mounted driver 140 because a greater percentage of the total driver magnetic flux 1510 of concentric driver 220 interacts with the permanent magnets 360.

Figure 20:
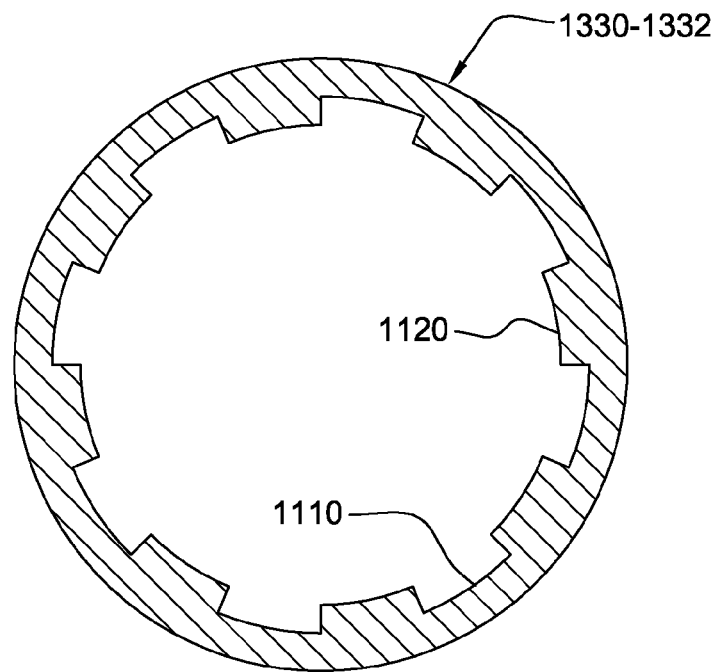
FIG. 20 is a front view of a balancer reticulated pole plate.

A front view of pole plates 1330-1332 is shown in FIG. 20. Pole plates 1330-1332 are comprised of magnetic material. In one embodiment of the invention, the pole plates 1330-1332 have a slightly larger outer diameter than rotors 1350, 1351. The pole plates 1330-1332 also can have generally rectangular flanges and/or reticulated notches 1110 which are equally spaced around the inner circumference of the pole plates 1330-1332. The circumferential width of the notches can be the same as the circumferential width of the protruding material 1120 between each notch. The pole plate reticulated notches 1110 normally cooperatively, frictionlessly, and magnetically receive the permanent magnet-containing rotor 350. The notches 1110 function to channel the permanent magnets' fields to hinder the controllable position counter weight rotor from rotating. This effect means that the balancer controllable position counter weight rotors will resist "slip" even when unpowered by an external source, allowing the balance state to remain unchanged even when the rotating machine undergoes significant rotational acceleration.

Figure 21:
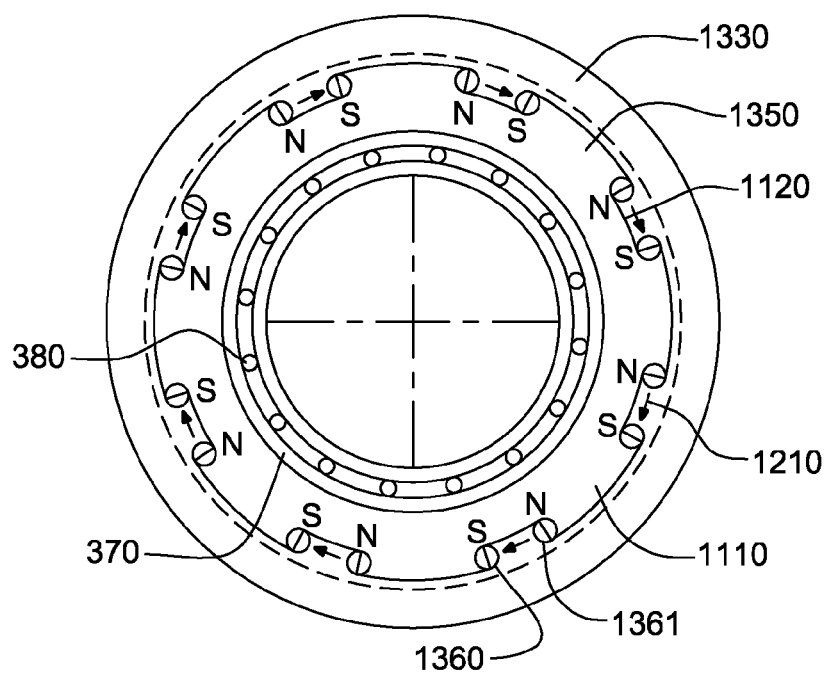
FIG. 21 is a front view of a balancer assembly showing the alignment of rotor permanent magnets with a reticulated pole plate at a detent position of the rotor.

FIG. 21 shows the stable equilibrium position of the controllable position rotor 1350 with its permanent magnets 1360,1361 aligned with the edges of each pole plate notch 1110. Note that the magnets 1360, 1361 are mounted with alternating polarity. The arrows 1210 in the figure represent the path of magnetic flux from one magnet across the pole plate protrusion 1120 to the adjacent magnet. As is further shown in FIG. 22, a cross-section of a single magnet pair and pole plate protrusion pair, the permanent magnet pair 1360-1361 normally drives a magnetic circuit formed by facing plate protrusions 1120, 1121 and permanent magnet pairs 1360-1361. The magnetic circuit flux lines 1210 are represented by arrows in FIGS. 21 and 22. The configuration of magnets 1360, 1361 relative to the pole plate protrusions 1120-1121 represents the stable equilibrium position of the rotor. Since magnetic circuit reluctance is minimized in this rotor position, any angular perturbation of the rotor will result in a torque on the rotor acting to restore it to the stable equilibrium position and, therefore, resist rotor slip.

While the geometric shape of the notches 1110 is generally rectangular, it should be realized that other shapes are possible and/or desirable, including circular or elliptical shapes. In one embodiment, there are 16 such notches and the pole plates 1330-1332 are separated from the surfaces of the rotors 1350, 1351 by about 0.1 inch. In one embodiment, the middle or center pole plate 1331 has notches similar to the other two pole plates 1330 and 1332. In another embodiment, plate 1331 can have no notches, and can be constructed of a single piece of magnetic material such as structural steel. The absence of notches 1110 in the center pole plate 1331 can decrease the maximum resistance to rotor slip by approximately two times.

When the active balancer driver 140 is energized, a time-varying magnetic field is induced in the pole plates 1330-1332 and magnets 1360, 1361. In one embodiment, each of the pole plates 1330, 1331, and 1332 are made of steel or a steel laminate to reduce eddy current losses due to this time-varying magnetic field. The permanent magnet flux circuit 1210 is selectively interrupted by the driver flux 1510, thereby causing movement of the magnets 1360, 1361 and rotors 1350, 1351.

Figure 22:
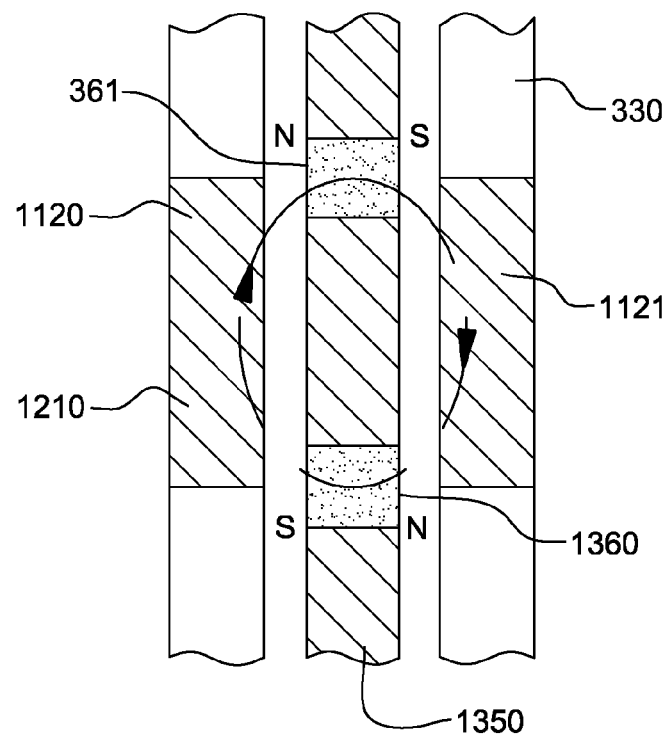
FIG. 22 is a partial cross-sectional view of the pole plates and rotor seen in FIG. 12 showing the permanent magnet flux path.
Figure 23:
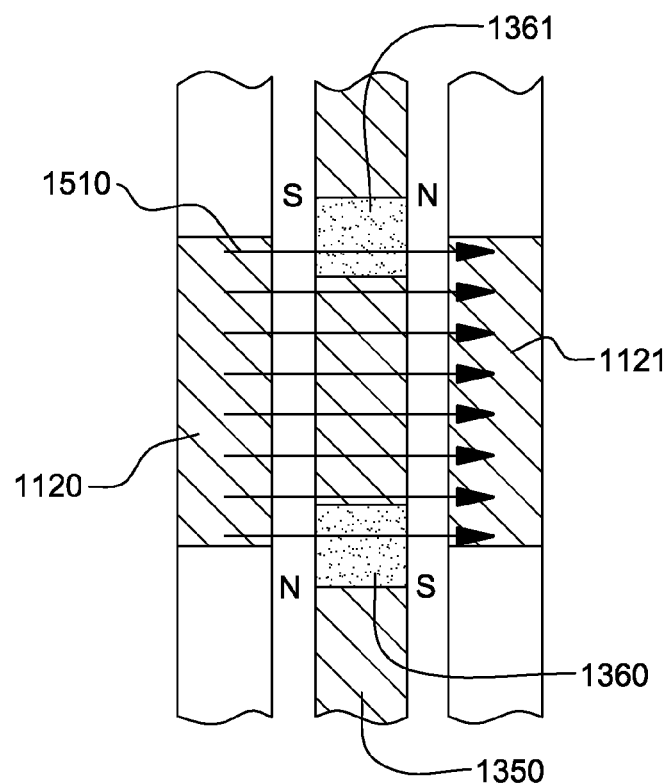
FIG. 23 shows an additional view of a driver magnetic field flux path.
Figure 24:
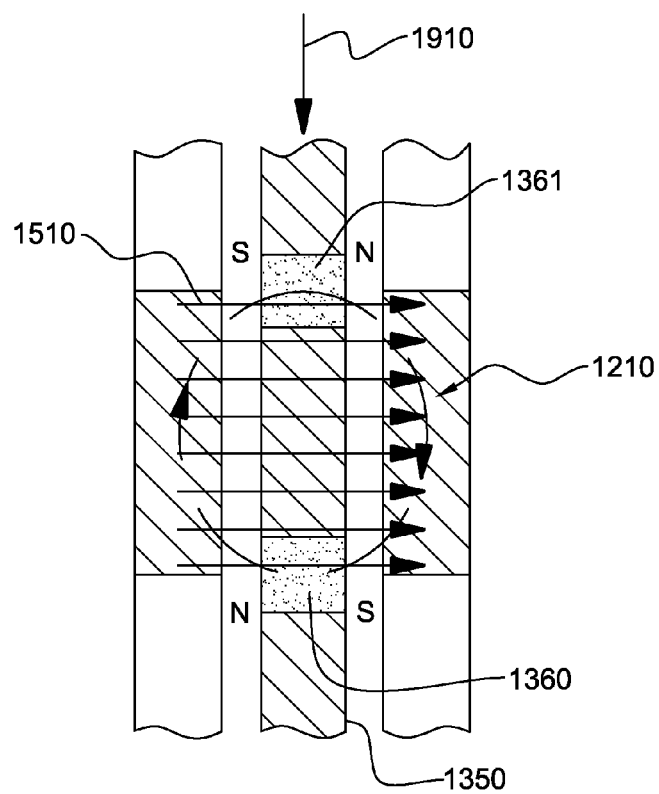
FIG. 24 illustrates the interaction of the driver magnetic field and the permanent magnet field.

FIG. 23 shows a cross sectional view similar to FIG. 22. Magnetic flux 1510 flows between pole plate protrusions 1120 and 1121 and across the non-magnetic rotor 1350 and permanent magnets 1360, 1361. In FIG. 24, the magnetic flux 1510 from the driver 140 is shown juxtaposed on the flux 1210 due to the permanent magnets 1360, 1361. As the two magnetic fields interact, the flux lines or fields of the lower portion of the circuit (e.g., at the bottom of magnet 1360) generally cancel, but the flux lines or fields at the top of magnet 1361 are additive. Such field interaction creates a force 1910 on the rotor 1350 in a direction perpendicular to the driver-generated magnetic field 1510. This force 1910 is generated because the rotor is attracted to a position that maximizes magnetic flux density while minimizing magnetic reluctance. Such a position is found when the magnet 1361 is aligned with the midpoint of a pole plate protrusion 1120 and the magnet 1360 is aligned with the midpoint of the pole plate notches 1110.

Figure 25:
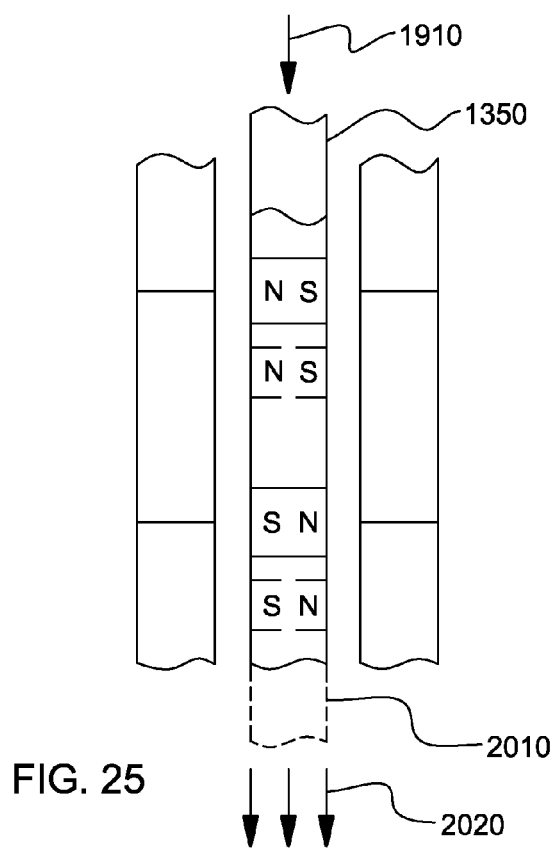
FIG. 25 shows how the rotor moves in the direction of the electromagnetically generated actuation force.
Figure 26:
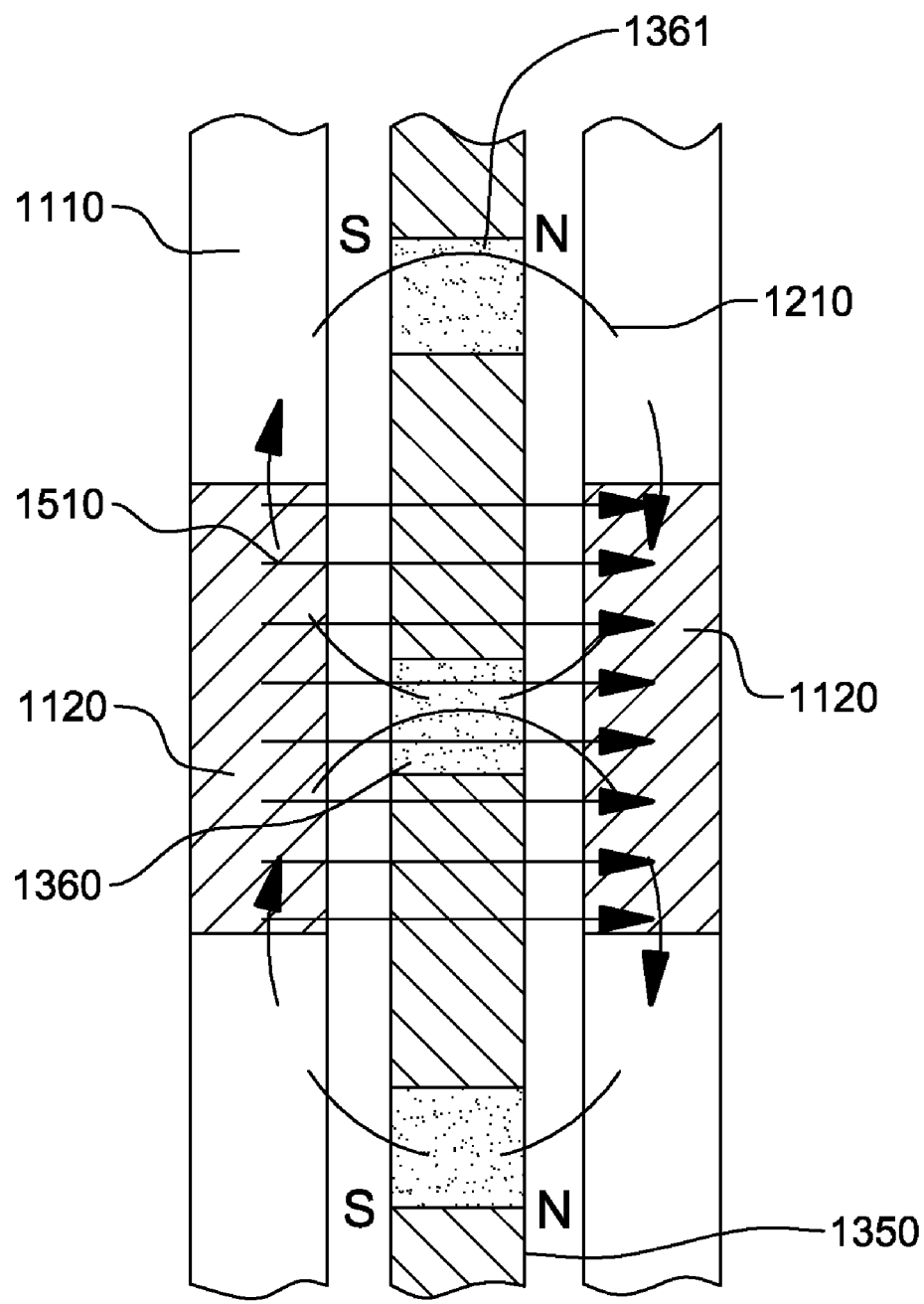
FIG. 26 illustrates the driver magnetic field and the permanent magnet field when the rotor is at an unstable equilibrium mid-detent position.

FIG. 25 illustrates the intermediate new position 2010 of rotor 1350 as the rotor 1350 moves in the direction 2020 of the electromagnetically-generated actuation force 1910. Once the driver field 1510 is removed, a mid-notch position becomes unstable. Thus, the dynamics of the rotor 1350 are governed by the forces caused by the interacting driver and permanent magnetic fields 1510, 1210 when the driver 140 is energized. When the driver 140 is not energized, the permanent magnets alone tend to restore the rotor to a stable equilibrium position. This stable position is where the magnets 1360, 1361 are aligned with the edges of the pole plate notches 1110 as shown in FIG. 21.

At least in theory, in rare situations, the rotor 1350 may become "stuck" in an unstable equilibrium position. FIG. 26 again shows the driver magnetic field 1510 and permanent magnet field 1210. The rotor 1350, however, is in a "mid-detent" position where the magnets 1361, 1360 are aligned with the midpoint of the pole plate notches 1110 or protrusions 1120. Since the rotor 1350 is already at the stable equilibrium for the energized coil condition, there will be no torque on the rotor 1350 due to the driver coil field 1510. When the driver coil 1320 is not energized, the rotor 1350 is then in an unstable equilibrium position. There will be no net torque on the rotor 1350 as long as it remains exactly at the "mid-detent" position. If the rotor is perturbed from the position, however, it will rotate to a stable equilibrium where its magnets 1360, 1361 are aligned with the edge of a pole plate notch 1110. The greater the "Coulomb" or "dry" friction in the rotor bearing, the greater the possibility of the rotor 1350 becoming stuck at the mid-detent position. Therefore, it is advantageous to minimize the amount of dry friction in the rotor bearing 1370. If the rotor sticks, the balancer 1260 could be rotationally accelerated to nudge the rotor 1350 sufficiently to cause the rotor 1350 to return to the stable equilibrium position. Furthermore, in many cases, a small driver coil exciter pulse can be used. Given that there would be small imperfections and asymmetries in the permanent magnet and pole plate material, a small pulse could generate a small torque on the rotor 1350 to displace it from the unstable equilibrium. However, it is also advantageous to have a certain amount of viscous fluid friction present to act on the rotor 1350.

The driver excitation pulse, in some embodiments, is relatively brief, and can last only as long as is required for the rotor 1350, 1351 to move from one reticule to a mid-reticule position. Beyond this position, the coil driver-induced force acts in an opposite direction, attempting to return the rotor to the mid-detent position. The electrical pulse must be of the appropriate magnitude and duration to cause a torque which will impart the rotor momentum required to allow the rotor to step into the next detent position and not beyond. The change in momentum of the rotor is caused by imparting an impulse.

Figure 27:
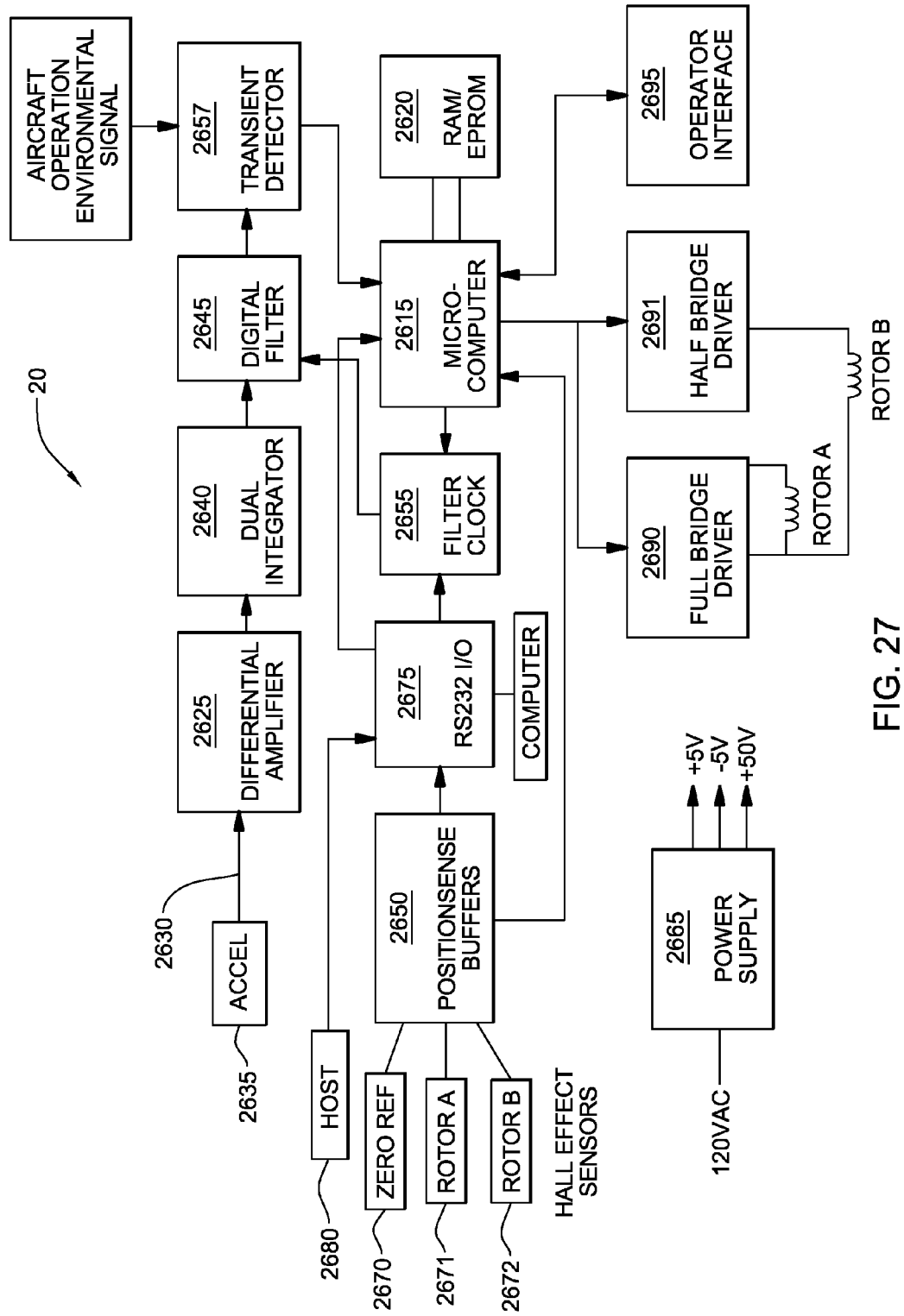
FIG. 27 is a block diagram of one embodiment of a balancer controller/power driver control system.
Figure 28:
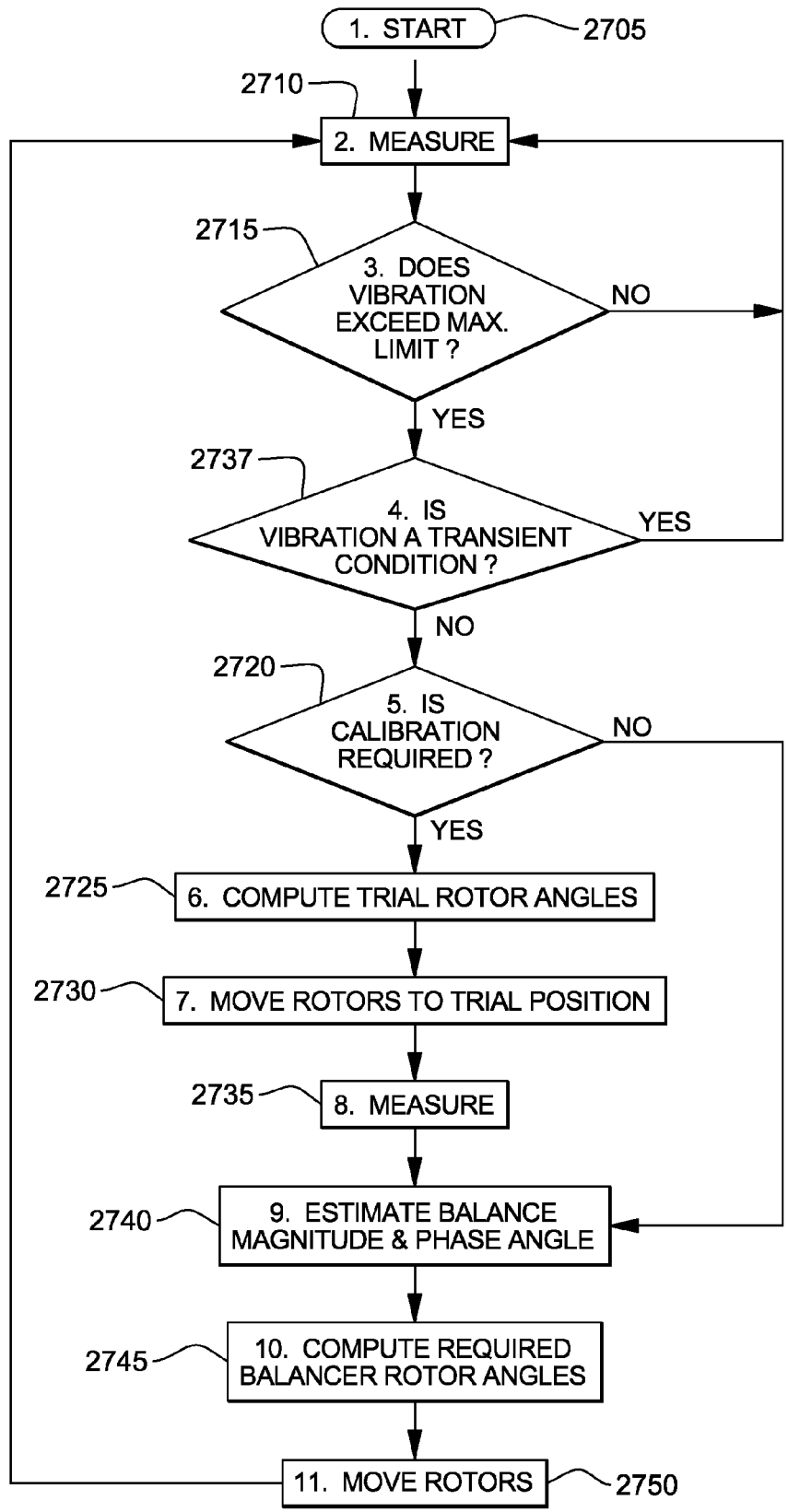
FIG. 28 is a flow chart illustrating sequence of steps associated with dynamically balancing a rotating machine with an active balancer.

To understand the dynamic balancing control techniques used, reference is now made to FIG. 27. FIG. 27 shows a schematic representation of one embodiment of controller 20. In this embodiment, controller 20 includes a microcomputer 2615, such as a commercially available microcontroller with a microprocessor CPU. Microcomputer 2615, as should be apparent to those of ordinary skill in the art, can include a 16-bit microcontroller with a 16-bit central processing unit adapted to perform "on-line" calculations, and a 10-bit analog to digital converter to digitize the analog vibration signals received by the microcomputer 2615. The microcomputer 2615 can also include three edge sensitive timers that are adapted to measure the pulse duration of signals received from the position sensors 46, 48. Lastly, microcomputer 2615 can include a serial port of the RS-232C type. In one embodiment, all of the required control algorithms can be computed and performed within microcomputer 2615.

As further shown in FIG. 27, controller 20 can further include a memory module 2620 communicatively coupled to microcomputer 2615. In one embodiment, the memory module 2620 is a commercially available programmable microcontroller. Memory 2620 can include about 32K bytes of read only type memory and about 2K bytes of random access type memory. In one embodiment, all of the software programs which are used to define the operation of controller 20 are stored in memory 2620, including all of the software variables.

Controller 20, as shown in FIG. 27, also can include a differential amplifier 2625. In one embodiment, the differential amplifier 2625 is a commercially available low noise, precision rail to rail output operational amplifier. Amplifier 2625 is adapted to receive signal 2630 from either a velocity or an acceleration transducer sensor 2635. Sensor input signal 2630 is therefore indicative of the amount or amplitude of the measured vibration. Differential amplifier 2625 can receive input from the sensor transducer 2635, substantially eliminating common mode type noise such as that referred to as "60 Hz hum". The amplified and conditioned signal can then be output and communicatively coupled to the dual integrator 2640.

The controller 20 can further include a dual integrator 2640. In one embodiment, dual integrator 2640 is a commercially available dual low noise precision rail to rail linear CMOS dual operational amplifier. Dual integrator 2640 can receive the amplified and conditioned signal from amplifier 2625 and convert the signal to a displacement or position value associated with the shaft 47. The converted signal is then communicatively coupled to a digital filter 2645. In one embodiment, the filter 2645 is a commercially available microprocessor programmable universal active filter.

In one embodiment of this invention, filter 2645 is comprised of a fourth order digital filter of the narrow band type. Specifically, this filter is adapted to have a center frequency that is directly related to the rotational speed of the rotating machine shaft that is received and discussed in reference to the buffers 2650. As shown, the filter center frequency is controlled by an output signal emanating from filter clock 2665. In one embodiment of the invention, the center frequency of filter 2645 can be about 1/100 that of the frequency of the clock 2655. Moreover, the frequency of the clock 2655 is controlled by microcontroller 2615 in response to the rotational speed values that it receives. The output of this filter is received by a transient detector 2657. The transient detector 2657 is communicatively coupled to the microcomputer 2615, and is evaluated using the system software.

Controller 20 also can include a series of position sense buffers 2650. In one embodiment, the sense buffers are commercially available inverting Schmitt trigger buffer. The buffers 2650 receive input signals from Hall effect devices 2670, 2671 and 2672. In one embodiment, the Hall effect devices 2670-2672 are commercially available thermally balanced integrated circuit unipolar Hall-Effect digital position sensors. The Hall effect sensors 2670-2672 are stationary with respect to the rotating machine and are mounted in close non-contacting proximity to the active balancer 110, 1210. The output signals of the Hall effect devices 2670-2672 are respectively representative of shaft position and the positions of balancing rings 350, 351 or rotors 1350 and 1351. More particularly, each of these sensors 2670-2672 produces a pulse that is proportional to the length of time that the particular sensor is in proximity to the magnet targets located on the rotating balance rings 350, 351 or rotors 1350 and 1351. As should be apparent to one of ordinary skill in the art, shaft speed can be computed by counting the rate of Hall effect sensor pulses caused by the passing rotating assembly magnetic target. Angular position of each rotor relative to the rotating assembly can then be inferred by observing the phase shift between sensor pulses caused by magnetic targets on each rotor and pulses caused by the rotating assembly magnetic target.

The output data is temporally stored in a buffer 2650 that is communicatively coupled to the microprocessor 2615. The stored data is used by system software in a manner described below. As further shown, controller 20 includes a communications portion 2675, which in one embodiment of the invention is a commercially available module or chip commonly referred to as a line driver/receiver communication interface multichannel RS-232 driver/receiver. By use of portion 2675, microcontroller 2615 can communicate information to a typical host computer 2690, and receive information from the host 2690.

As also shown in FIG. 27, controller 20 can include a full bridge driver 2690 and a half bridge driver 2691, which can be commercially available high voltage high speed power MOSFET and IGBT drivers with independent high and low side referenced output channels (high and low side driver). It should be realized by one of ordinary skill in the art that a full bridge driver 2690 includes two such components while driver 2691 includes only one such component. In one embodiment of the invention, balance rings 350 or rotor 1350 is controlled by driver 2690, while balance ring 351 or rotor 1351 is controlled by the combination of drivers 2690 and 2691. Such control is achieved by the selective energization of the drivers 2690 and 2691 by the microcontroller 2615 in response to the stored software program included within memory 2620. Lastly, controller 20 can include an operator interface portion. Component 2695 is communicatively coupled to microcomputer 2615, and can be configured to permit a human operator to provide inputs to and receive information from the microcomputer 2615. Thus, the microcontroller 20 receives signals indicative of rotating shaft vibration and the balance ring/rotor positions. In response to the received signals, the microcontroller 20 selectively energizes one or both drivers 2690 and 2691 to cause the balance rings/rotors to rotate to their desired positions and correct a shaft imbalance.

In some embodiments of the invention, microprocessor based controller 2615 contains software algorithms stored in memory which cause the automatic operation of the active balancer to dynamically balance the rotating machine in real time. To compensate for rotating machine unbalance, the unbalance magnitude and angular position on the shaft should be estimated. The following discussion details the calculations for this estimation and steps for real time dynamic automatic balancing in the preferred embodiment of the invention.

The relationship between vibration amplitude and the magnitude of rotating shaft unbalance is assumed linear, but is unknown. The assumption of linearity is appropriate for most applications, since although vibration magnitudes are significant, they are relatively low. A mathematical algorithm is used to estimate unbalance magnitude and angular position based on certain measurable quantities. To accomplish the estimation when no machine data is previously stored, a "trial" balance step is required for calibration. This means that after start-up, the balancer "ballast" must be moved to an arbitrary trial position before it can be moved to the final correction position. Since the balancer rotors may "slip" during shaft start-up due to limited holding torque, the initial balance correction would not necessarily be "neutral". Balance correction could be in any position. The vector math equations described below take this possibility into account. For certain applications, however, the vibration-unbalance relationship for a machine configuration would be known a priori. In such instances, calibration using a trial balance correction would be unnecessary. To reduce balance time required, the balancer rotors could be directly moved to the appropriate compensating positions after shaft start-up. It is prudent, however, to implement a routine for the more general case where the vibration-unbalance ratio is not necessarily known. Steps in one embodiment of the automatic balancing algorithm for the general case are outlined in the flow chart of FIG. 28. The steps are described below:

Step 1, Propeller Start-up (2705):
Upon start-up, the balancer controller begins the automatic monitoring/balancing routine.

Step 2, Measurement (2710):
The following quantities are measured using the vibration transducer sensor and shaft and balance ring/rotor position sensors:
Initial vibration amplitude (peak amplitude in units of length) Initial vibration phase angle (radians, with respect to an arbitrary shaft reference) Initial balance ring/rotor angles Step 3, Imbalance Determination (2715):
The peak vibration level is compared to a preset vibration limit. If vibration exceeds the maximum limit, the balancing routine is implemented. If vibration remains below the set limit, the balancer controller returns to the measurement step 2 2710 and vibration is continuously monitored.

Step 4, Transient Detection (2737):
The transient detector determines whether the measured imbalance condition is a transient condition that does not merit balance correction. If imbalance condition is a transient condition, the balancer controller returns to the measurement step 2 (2710) and vibration is continuously monitored. If the imbalance condition is not a transient condition, the algorithm proceeds to step 5 (2720). The transient condition determination is discussed in detail below.

Step 5, Calibration choice (2720):
If stiffness data is available which maps speed and unbalance information to shaft vibration level, no balancer calibration is required and the algorithm skips directly to step 9 (2740).

Step 6, Trial balance ring/rotor angle computation (2725):
The trial calibration angles for the balance rings/rotors are chosen based on certain criteria. The criteria include but are not limited to: 1) Minimizing unbalance during the calibration step; 2) Minimizing balancer error due to measurement uncertainties; or 3) Minimizing time required for balancing.

Step 7, Balance Ring/Rotor actuation to trial positions (2730): The rotors are actuated to the required trial positions using driver 120. Step 8, Measurement (2735):
The following quantities are measured:
"Trial" vibration amplitude (peak amplitude in units of length)
"Trial" vibration phase angle (radians, with respect to the arbitrary machine reference)
"Trial" balance ring/rotor angles Step 9, Estimation (2740):
Using the values measured above, the controller calculates the unbalance magnitude (in units of mass-length, or unit-less % of balancer capacity) and phase angle. The estimation method is described in more detail below.

Step 10, Balance ring/Rotor angle computation (2745):
Calculate the balance ring/rotor angles that will provide the required net correction vector. If the respective balance ring/rotor unbalance magnitudes are very closely similar, for example, the balance rings/rotors would be placed at appropriate equal angles from the effective correction angle. Which balance ring/rotor moves to which position could be decided based on certain criteria such as: 1) Minimizing time to balance; or 2) Minimizing unbalance magnitude present during the time the balance rings/rotors move.

Step 11, Balance Ring/Rotor actuation (2750):
The balance rings/rotors are moved to the required positions by the driver 220, 1210.
The controller then returns to step 2 (2710) to monitor shaft vibration until further balancing is unnecessary.

Rotating unbalance is estimated in step 9 (2740) using concepts from vector algebra. To facilitate estimation, the measured vectors from steps 2 (2710) and 7 (2735) are broken down into their Cartesian x and y-direction components.

With the balancer 110, 1210 mounted on rotating shaft 47, the total rotating unbalance will consist of the vector sum of balance ring/rotor unbalance magnitudes and the inherent shaft rotating unbalance. The measured vibration values, therefore, also result from the vector sum of each unbalance source. We define the unknown shaft rotating unbalance components as $X_u$ and $Y_u$. We also define the relationship between rotating unbalance and vibration level as "R." The ratio R is a function of bearing and shaft stiffness and is assumed unknown. If R is known for a given operating condition, then the estimation is much simpler, and is not described in detail.

The unbalance angle quadrant must be determined for successful balance compensation. Most high level programming language compilers include an intrinsic function "atan2" which calculates the angle of a vector in the appropriate quadrant given x and y-direction vector components. The required balance correction magnitude "B" will be the same as the unbalance magnitude. The correction angle will be 180 degrees (or pi radians) away from the unbalance. The correction angle should be mapped back into the appropriate polar quadrant if it exceeds 360 degrees. This correction is implemented using the two balancer rotors. In some cases, the rotors would have slightly different unbalances due to manufacturing variations. In such cases, slightly more complicated formulas are required that involve trigonometry. Which balance ring/rotor should move to which position is then determined such that the balance rings/rotors travel the minimum combined distance. This minimizes time required for the final balancing step.

Referring again to FIG. 2, aircraft balancer system 10 further includes a balance controller 20 that calculates an adjustment to the adjustable balance rings/rotors 350, 351 or 1350, 1351 of the balancer 110, 1210 when an imbalance condition is detected based on vibrations on engine/gearbox 18. In one embodiment, controller 20 is a general-purpose processor that executes instructions stored on a memory device. However, controller 20 can be a specialized processor, and may be entirely hardware, or a combination of hardware and software. Controller 20 is coupled to a position sensor 46 that provides positioning information regarding the placement of balance rings/rotors 350, 351 or 1350, 1351. A vibration sensor 44 is coupled to the aircraft propeller system, and generates a signal that is substantially proportional to the vibration of the propeller. In one embodiment, vibration sensor 44 is coupled to engine/gearbox 18 and the signal corresponds to the vibration on engine/gearbox 18. In other embodiments, vibration sensor 44 may also be coupled to propeller 12 and/or shaft 47 to further detect vibrations on those components. Controller 20 receives the vibration signal from sensor 44, and if enabled by transient detector 42 as disclosed below, calculates a signal that moves balance rings/rotors 350, 351 or 1350, 1351 to correct any imbalance.

In one embodiment, controller 20 calculates an imbalance correction based on received vibration signals as disclosed in U.S. Pat. No. 6,618,646. In other embodiments, other known algorithms and computing methods can be used by controller 20 to calculate an amount of adjustment of balance rings/rotors 350, 351 or 1350, 1351 based on vibration signals.

In general, two parameters are used in the method disclosed in U.S. Pat. No. 6,618,646 to calculate an amount of adjustment of balance rings/rotors based on vibration signals. An "Alpha" parameter is used to set how aggressively controller 20 seeks to make balance corrections. The Alpha factor is multiplied by the correction determined from an influence coefficient to determine the actual amount of correction to be applied. An Alpha factor of 0.90 would result in making a correction of 90% of the amount determined by using the raw influence coefficient. Typically, Alpha parameters of 0.90 or below are used.

A "Beta" parameter is used to set how aggressively new influence coefficient data is used to replace old data. The Beta factor is multiplied times a new influence coefficient and (1—Beta) is multiplied by the old influence coefficient. This is summed to provide the weighted average to be stored for use in the next automatic balancing sequence. A Beta factor of 0.90 would result in weighting the most recent influence coefficient by 90% and the old influence coefficient by 10%. Typically, Beta parameters of 0.90 or below are used.

These two parameters, Alpha and Beta, are sufficient for tuning balancer performance for applications in which vibration signals are stationary or are changing slowly with time. However, these parameters are not ideal for applications with rapidly changing and/or erratic vibration signals, such as with rotating aircraft members (e.g., aircraft engines, gearboxes, shafts and propellers). For these applications, transient management should be used to ensure optimal balancer performance. In an embodiment determining whether the vibration signal represents a transient vibration condition preferably includes monitoring an aircraft operation environmental signal. Preferably the monitored aircraft operation environmental signal is an aircraft control system output representative of transient condition environment, preferably an operator induced transient change, preferably a pilot induced flight control change, such as a change in throttle. Preferably the monitored aircraft operation environmental signal is an output from an instrument measuring an aircraft environmental condition such as a device measuring a change in altitude or attitude. In an embodiment the balancer control system 5 accepts at least a first aircraft operation environmental output such as from aircraft control system 3, with the balance control system 5 preferably utilizing the aircraft control system 3 output signal representative of a transient condition environment in determining whether the vibration signal represents a transient vibration condition and inhibiting balance correction during such transient vibration conditions that occur with transient condition environments.

Transient detector 42 provides the transient management in one embodiment of the present invention. Transient detector 42 receives the vibration signals from vibration sensor 44, and based on the signals either disables or enables controller 20 so that controller 20 only responds to non-transient imbalance conditions and ignores temporary erratic vibration transients. Like controller 20, transient detector 42 may be a processor executing instructions stored in memory, or implemented completely in hardware. Further, the functionality of transient detector 42 may be implemented on the same processor or hardware devices as controller 20. In one embodiment, transient detector 42 uses three tuning parameters to detect transient vibration. The parameters are as follows:

"Cutoff Frequency" is the ratio of an actual cutoff frequency over the Nyquist Frequency and sets the cutoff of a single-pole low pass filter used to filter out transients in the vibration signal. The lower this value, the more time is needed to react to transients. In one embodiment, Cutoff Frequency is set at approximately 0.1.

"Deviation Threshold" is expressed in inches/second ("ips"), and establishes the maximum allowable difference between the raw vibration signal and the low-pass-filtered vibration signal. The lower this value, the lower the allowable difference before controller 20 could be enabled. In one embodiment, Deviation Threshold is set at approximately 0.04 ips.

"Threshold Count" sets the minimum number of consecutive samples for which the deviation threshold must be met before controller 20 is enabled. The higher this value, the longer the delay before controller 20 is enabled. In one embodiment, Threshold Count is set to about four.

Figure 29:
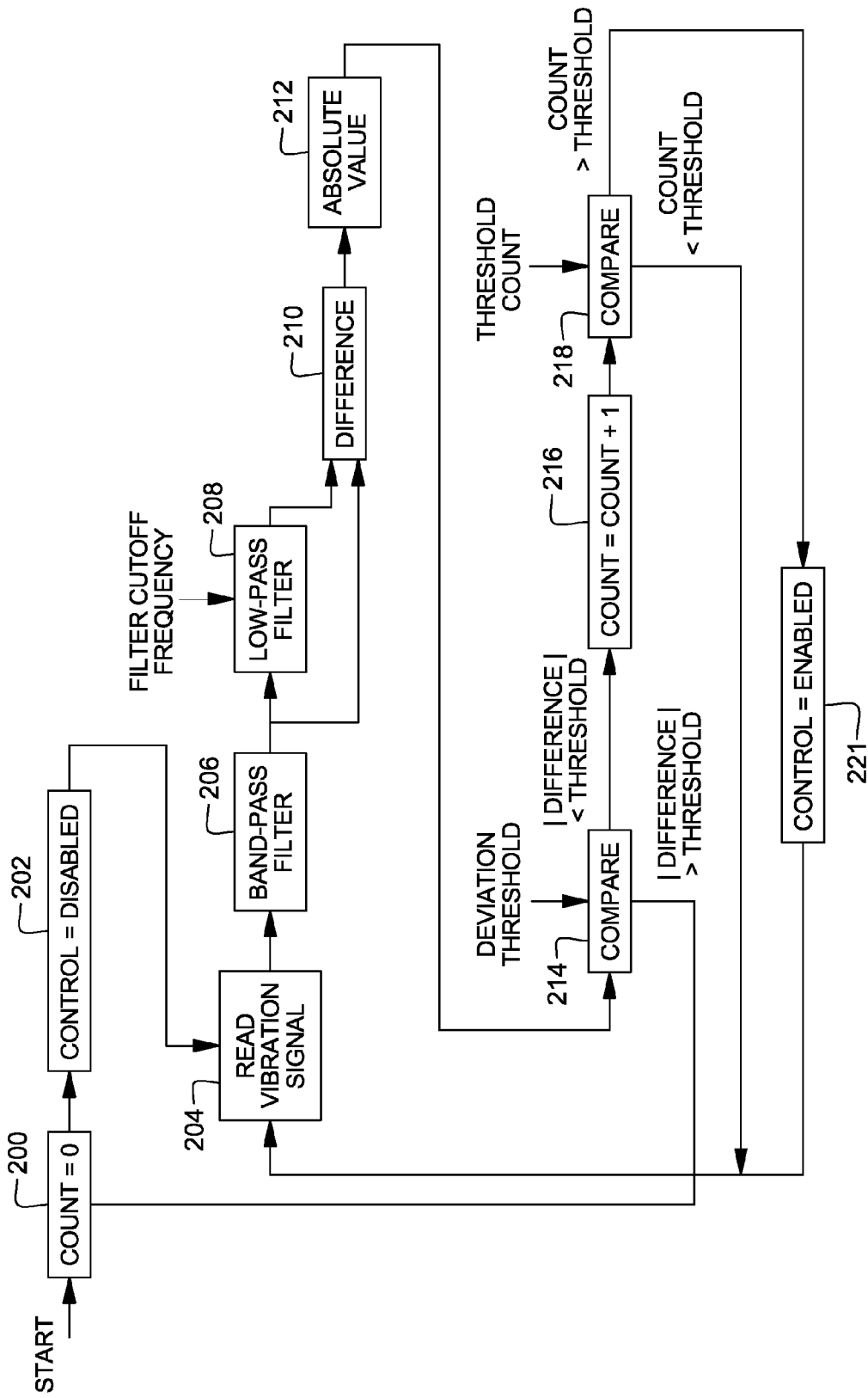
FIG. 29 is a flow diagram of the functionality of the aircraft balancing system and a transient detector when determining whether to enable or disable a balance controller in accordance with one embodiment of the present invention.

FIG. 29 is a flow diagram of the functionality of system 10 and transient detector 42 when determining whether to enable or disable controller 20 in accordance with one embodiment of the present invention. The functionality of FIG. 29 is implemented by software stored in memory and executed by a processor. In other embodiments, the functionality can be performed by hardware, or any combination of hardware and software. Inputs to the functionality of FIG. 29 are the three variables disclosed above (Cutoff Frequency, Deviation Threshold and Threshold Count).

Initially a "Count" variable is set to zero (200) and controller 20 is disabled (202). The vibration signal from vibration sensor 44 is then read (204).

The vibration signal is then band-pass filtered at the rotational speed of the aircraft rotating member, such as propeller 12 (206). In one embodiment, the signal is band-pass filtered at nP, where n=1. In other embodiments, the signal is band-pass filtered at a harmonic of the rotational speed of the aircraft rotating member. In one embodiment, the harmonic is nP, where n is a whole number greater than one. The signal is then low-pass filtered (208) using the Cutoff Frequency as an input. The difference between the band-pass filtered signal and the low-pass filtered signal is then calculated (210) and the absolute value of the difference is determined (212).

A comparison is made between the absolute value of the difference and the Deviation Threshold (214). If the absolute value of the difference is less than the Deviation Threshold, the count is incremented by one (216). If the absolute value of the difference is greater than the Deviation Threshold, flow returns to 200 where the count=0.

After the count is incremented by one at 216, a comparison is made between the Threshold Count and the count (218). If the count is greater than the Threshold Count is, controller 20 is enabled (221) and flow continues at 204. When controller 20 is enabled, controller 20 can make adjustments to balance correction rotors 14 based on the vibration signals. If the count is less than the threshold count at 221, flow continues at 204 and controller 20 continues to be disabled.

Figure 30:
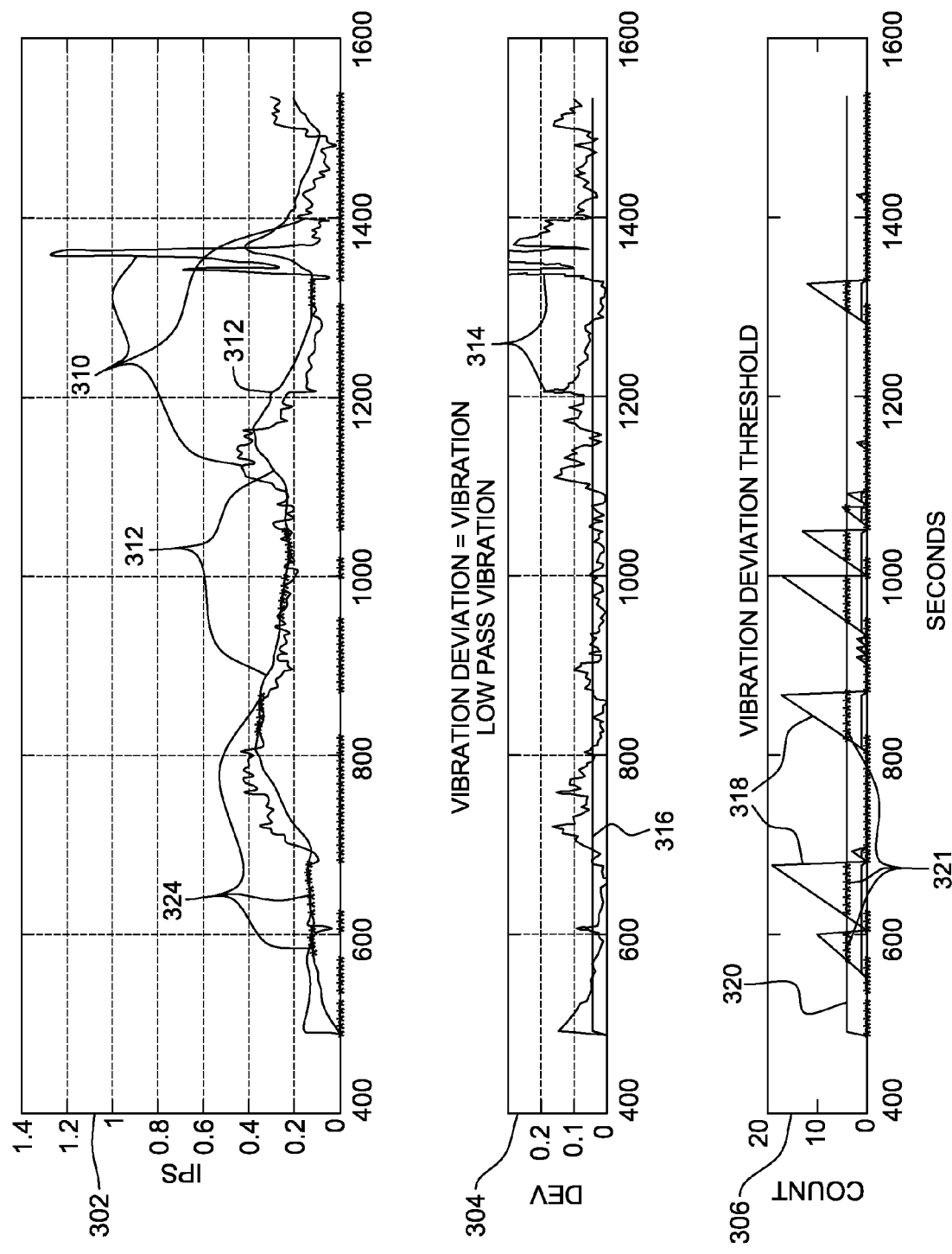
FIG. 30 graphically illustrates the operation of the transient detector in accordance with one embodiment.

The operation of transient detector 42 in accordance with one embodiment is graphically illustrated in FIG. 30. The vibration signal from vibration sensor 44 (ips) is band-pass filtered at the rotational speed and plotted in graph 302 as trace 310. The vibration is then low-pass filtered with a single-pole filter and plotted in graph 302 as trace 312. As shown, trace 312 is smoothed and delayed compared to trace 310. The difference between traces 310 and 312 is also plotted in graph 304 as trace 314. The allowable difference between the two signals (i.e., the Deviation Threshold) is plotted as a flat line set at 0.04 ips (line 316 of graph 304). The first criterion for controller 20 to be enabled is that this difference (trace 314) must be less than the threshold (line 316).

Once this initial criterion is met, a count is started. This cumulative count is plotted in graph 306 as trace 318. When this cumulative sum exceeds a prescribed threshold (for example a cumulative sum of 4 as shown as trace 320 of graph 306), a sufficiently stable operating condition has been reached so that controller 20 may be enabled. This controller-enabled condition is shown in graph 306 as "+" marks 321 superimposed on trace 320. This controller-enabled condition is also shown in graph 302 as "+" marks 324 superimposed on low-pass-filtered vibration trace 312. As shown, the "+" marks in graph 302 coincide with less erratic segments of the vibration signal of trace 310. Therefore, the controller-enabled condition mostly occurs when transients are not occurring.

As disclosed, embodiments of the present invention detect transient vibration signals and prevent a controller of an aircraft balancing system from correcting an imbalance of an aircraft propeller and shaft based on the transient signals. This assures that only true imbalances of the propeller and shaft are corrected.

Several embodiments of the present invention are specifically illustrated and/or described herein. However, it will be appreciated that modifications and variations of the present invention are covered by the above teachings and within the purview of the appended claims without departing from the spirit and intended scope of the invention.

Further, although embodiments of the present invention have been disclosed in conjunction with an aircraft propeller, the present invention can be utilized with any rotating equipment that needs balancing, including fans, pumps, turbines, generators, compressors, grinders, lathes, spindles, drive shafts, etc.

What is claimed is:

1. A method of balancing an aircraft propeller system comprising: receiving a vibration signal from the aircraft propeller system; determining whether the vibration signal represents a transient vibration condition, wherein said determining whether the vibration signal represents a transient condition includes: creating a band-passed filtered vibration signal from the vibration signal; low-pass filtering the vibration signal based on a cutoff frequency to create a low-passed filtered vibration signal, wherein the vibration signal is first subjected to the step of band-pass filtering prior to the step of low-pass filtering; calculating a difference of the band-passed filtered vibration signal and the low- passed filtered vibration signal; comparing the difference with a predetermined threshold; defining a threshold count having a minimum value, the minimum value being a minimum number of consecutive samples for which the predetermined threshold must be met to enable the balance correction controller; enabling a balance correction controller if it is determined that the vibration signal does not represent a transient vibration condition; generating a balance correction signal at the balance correction controller based on the vibration signal; and balancing the aircraft propeller system in response to the balance correction signal.

2. The method of claim 1 wherein the balance correction signal is communicated to an automatic balance correction mechanism the balance correction mechanism comprising at least one balance correction rotor, and the balance correction signal causes the rotor to move to balance the aircraft propeller system.

3. The method of claim 1 wherein determining whether the vibration signal represents a transient vibration condition includes monitoring an aircraft operation environmental signal.

4. The method of claim 1, wherein said determining whether the vibration signal represents a transient condition further comprises:
determining if an absolute value of the difference is less than the predetermined threshold over a finite time period.

5. An aircraft with an aircraft propeller system and a propeller balancing system comprising: a balance correction mechanism coupled to the aircraft propeller system; a vibration sensor coupled to the aircraft propeller system for generating a vibration signal; a transient detector coupled to said vibration sensor; and a balance controller coupled to said balance correction mechanism, said vibration sensor, and said transient detector; wherein said transient detector enables said balance controller when the vibration signal does not indicate a transient condition; wherein said transient detector is adapted to determine that the vibration signal does not represent a transient condition by: creating a band-passed filtered vibration signal from the vibration signal; low-pass filtering the vibration signal based on a cutoff frequency to create a low-passed filtered vibration signal, wherein the vibration signal is first subjected to the step of band-pass filtering prior to the step of low-pass filtering; calculating a difference of the vibration signal and the filtered vibration signal; and comparing the difference with a predetermined threshold.

6. The balancing system of claim 5, wherein said balance controller, if enabled, is adapted to generate a balance correction signal based on the vibration signal, and wherein said balance correction signal activates said balance correction mechanism to balance the aircraft propeller system.

7. The balancing system of claim 6, wherein said balance correction mechanism comprises a plurality of adjustable rotors and at least one permanent magnet.

8. The balancing system of claim 7, wherein said balance correction mechanism comprises at least two solid mass imbalance rotors each having an imbalance mass concentration.

9. The balancing system of claim 5, wherein said transient detector is adapted to further determine that the vibration signal does not represent a transient condition by:
  determining if an absolute value of the difference is less than the predetermined threshold over a finite period of time.

10. An aircraft with a power source, said power source including a rotating member, said aircraft comprising a balancing system with a balance correction mechanism coupled to the rotating member, said balancing system comprising: a vibration sensor for generating a vibration signal; a transient detector coupled to said vibration sensor; a balance controller coupled to said vibration sensor; wherein said transient detector enables said balance controller if the transient detector determines that the vibration signal does not represent a transient vibration condition; wherein said transient detector is adapted to determine that the vibration signal does not represent a transient condition by: creating a band-passed filtered vibration signal from the vibration signal; low-pass filtering the vibration signal based on a cutoff frequency to create a low-passed filtered vibration signal, wherein the vibration signal is first subjected to the step of band-pass filtering prior to the step of low-pass filtering; calculating a difference of the vibration signal and the filtered vibration signal; and comparing the difference with a predetermined threshold.

11. The aircraft of claim 10, wherein said balance controller, if enabled, is adapted to generate a balance correction signal based on the vibration signal, and wherein said balance correction signal causes at least a portion of said balance correction mechanism to move to balance the rotating member.

12. The aircraft of claim 11, wherein said balance correction mechanism comprises a plurality of rotors and at least one magnet.

13. The aircraft of claim 12, wherein said balance correction mechanism comprises at least two solid mass imbalance rotors each having an imbalance mass concentration.

14. The aircraft of claim 10, wherein said transient detector is adapted to determine that the vibration signal does not represent a transient condition by:
  determining if an absolute value of the difference is less than the predetermined threshold over a predetermined time duration.

15. A vibration control system for a machine with a rotating member, said vibration control system including an electromagnetically actuated correction mechanism coupled to the machine, said vibration control system comprising: a vibration sensor for generating a vibration signal; a transient detector coupled to said vibration sensor; a controller coupled to said vibration sensor; wherein said transient detector enables said controller if the transient detector determines that the vibration signal does not represent a transient vibration condition; wherein said transient detector is adapted to determine that the vibration signal does not represent a transient condition by: creating a band-passed filtered vibration signal from the vibration signal; low-pass filtering the vibration signal based on a cutoff frequency to create a low-passed filtered vibration signal, wherein the vibration signal is first subjected to the step of band-pass filtering prior to the step of low-pass filtering; calculating a difference of the vibration signal and the filtered vibration signal; and comparing the difference with a predetermined threshold.

16. The vibration control system of claim 15, wherein said controller, if enabled, is adapted to generate a correction signal based on the vibration signal, and wherein said correction signal causes at least a portion of the electromagnetically actuated correction mechanism to move to reduce a detected vibration.

17. The vibration control system of claim 16, wherein said correction mechanism comprises a plurality of rotors and at least one magnet.

18. A method of controlling an aircraft propeller vibration, said method comprising: providing an electromagnetically actuated vibration correction mechanism, receiving an aircraft propeller vibration signal; determining whether the propeller vibration signal represents a transient vibration condition, wherein said determining whether the vibration signal represents a transient condition includes: creating a band-passed filtered vibration signal from the vibration signal; low-pass filtering the vibration signal based on a cutoff frequency to create a low-passed filtered vibration signal, wherein the vibration signal is first subjected to the step of band-pass filtering prior to the step of low-pass filtering; calculating a difference of the band-passed filtered vibration signal and the low- passed filtered vibration signal; comparing the difference with a predetermined threshold;
  defining a threshold count having a minimum value, the minimum value being a minimum number of consecutive samples for which the predetermined threshold must be met to enable the balance correction controller; enabling a controller if it is determined that the vibration signal does not represent a transient vibration condition; generating a balance correction signal at the enabled controller based on the vibration signal;
  and using the balance correction signal to electromagnetically actuate said correction mechanism if the controller is enabled.

19. The method of claim 18 further comprising sending the balance correction signal to the correction mechanism.

20. The method of claim 18, wherein said determining whether the vibration signal represents a transient condition further comprises:
  determining if an absolute value of the difference is less than the predetermined threshold over a predetermined time duration.

* * * * *